(12) United States Patent
Sasaki

(10) Patent No.: US 11,928,276 B2
(45) Date of Patent: Mar. 12, 2024

(54) LIQUID CRYSTAL DISPLAY DEVICE AND DRIVING METHOD THEREFOR

(71) Applicant: Sharp Display Technology Corporation, Kameyama (JP)

(72) Inventor: Osamu Sasaki, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/093,155

(22) Filed: Jan. 4, 2023

(65) Prior Publication Data

US 2023/0229249 A1 Jul. 20, 2023

(30) Foreign Application Priority Data

Jan. 18, 2022 (JP) ................................. 2022-005413

(51) Int. Cl.
*G06F 3/041* (2006.01)
*G09G 3/36* (2006.01)

(52) U.S. Cl.
CPC ........ *G06F 3/0412* (2013.01); *G06F 3/04166* (2019.05); *G09G 3/3648* (2013.01); *G09G 2310/0213* (2013.01); *G09G 2310/0286* (2013.01); *G09G 2310/08* (2013.01); *G09G 2320/02* (2013.01)

(58) Field of Classification Search
CPC ............... G06F 3/0412; G06F 3/04166; G06F 3/04184; G06F 3/0443; G06F 3/0445; G06F 3/0446; G09G 2310/0205; G09G 2310/0213; G09G 2310/0286; G09G 2310/08; G09G 2320/02; G09G 2354/00; G09G 3/3648
See application file for complete search history.

(56) References Cited

U.S. PATENT DOCUMENTS

2016/0299587 A1* 10/2016 Huang .................... G06F 3/041
2018/0181243 A1* 6/2018 Tsunashima .......... G06F 3/0412
2019/0146619 A1 5/2019 Kurasawa et al.

FOREIGN PATENT DOCUMENTS

JP 2015-087608 A 5/2015
JP 2019-091291 A 6/2019

* cited by examiner

*Primary Examiner* — Robin J Mishler
(74) *Attorney, Agent, or Firm* — ScienBiziP, P.C.

(57) ABSTRACT

A plurality of gate bus lines are scanned one by one such that a video signal is written, via a corresponding source bus line, into each of pixel forming sections provided in a plurality of rows and a plurality of columns. When a sensor electrode is driven to detect a touch position, the scanning of the gate bus lines is stopped. Operation of a gate driver and operation of a touch sensor drive circuit are controlled such that, when the sensor electrode is driven, a stop row that is a row at which the scanning of the gate bus lines is stopped is different in each of a first frame period and a second frame period that are two consecutive frame periods.

6 Claims, 25 Drawing Sheets

CKX

CKXB

LIQUID CRYSTAL DISPLAY DEVICE AND DRIVING METHOD THEREFOR

CROSS-REFERENCE TO RELATED APPLICATIONS

This application claims the benefit of priority to Japanese Patent Application Number 2022-005413 filed on Jan. 18, 2022. The entire contents of the above-identified application are hereby incorporated by reference.

BACKGROUND

Technical Field

The following disclosure relates to an active matrix liquid crystal display device with a built-in touch sensor and a driving method therefor.

A liquid crystal display device that includes a display portion including a plurality of source bus lines (video signal lines) and a plurality of gate bus lines (scanning signal lines) has been known. In such a liquid crystal display device, a pixel forming section that forms a pixel is provided at each of intersections of the source bus lines and the gate bus lines. Each of the pixel forming sections includes a pixel thin film transistor (pixel TFT) in which a gate terminal is connected to the gate bus line passing through the corresponding intersection and in which a source terminal is connected to the source bus line passing through that corresponding intersection, a pixel capacitance (liquid crystal capacitance) configured to hold a pixel voltage value, and the like. The liquid crystal display device also includes a gate driver (a scanning signal line drive circuit) for driving the gate bus lines and a source driver (a video signal line drive circuit) for driving the source bus lines.

A video signal indicating the pixel voltage value is transmitted through the source bus lines. However, each of the source bus lines cannot transmit video signals indicating the pixel voltage values for a plurality of rows at one time (at the same time). Thus, the video signals are sequentially written (charged) into the pixel capacitances in the plurality of pixel forming sections provided in the display portion on a row-by-row basis. In order to achieve this writing scheme, the gate driver is constituted by a shift register having a plurality of stages so as to sequentially select the plurality of gate bus lines for a predetermined period each time. Then, active scanning signals are sequentially output from the plurality of stages to cause the video signals to be sequentially written into the pixel capacitances on the row-by-row basis as described above. Note that, in the following description, a circuit constituting each stage of the shift register is referred to as a "unit circuit", and sequential selection (scanning) of the gate bus lines one by one starting with the gate bus line at the first row and ending with the gate bus line at the last row is referred to as a "vertical scan".

Further, a touch panel has been used as an input device for performing operation in a computer system or the like. For example, in an electrostatic capacitance touch panel, a position of a detected object, such as a finger of an operator or a touch pen, is detected on the basis of a change in electrostatic capacitance. With regard to the liquid crystal display devices also, more and more devices are provided with such a touch panel.

Although there are several types of the touch panel, in recent years, an in-cell touch panel is becoming mainstream in the market. In the in-cell touch panel, a portion that functions as a touch sensor is built into a display panel, such as a liquid crystal panel. In the in-cell touch panel, for example, a sensor electrode having a rectangular shape and segmented into a plurality of rows and a plurality of columns is used, and touch detection is performed using a self-capacitance method. Further, an in-cell touch panel is also known that employs a configuration in which one electrode is provided serving as both the above-described sensor electrode and a common electrode used for image display. According to this configuration, the one electrode is used as both the sensor electrode for performing the touch detection and the common electrode for the image display. Thus, the thickness and the weight of the device can be reduced.

Note that the following related technology literature is known in relation to the disclosure. JP 2019-91291 A discloses a display device that can favorably perform touch detection (detection of a touched position on a touch panel) using an electromagnetic induction method, while sharing an electrode in an electrostatic capacitance method and an electromagnetic induction method. JP 2015-87608 A discloses a liquid crystal display device that saves power consumption by substantially stopping an input of image signals to image signal lines for a predetermined period, when a still image is being displayed and no contact on a touch panel is detected.

SUMMARY

Incidentally, in a liquid crystal display device provided with an in-cell touch panel, that is, a liquid crystal display device with a built-in touch sensor, an unintended malfunction occurs when driving for image display and driving for touch detection (hereinafter simply referred to as "touch driving") interfere with each other. Thus, a method is adopted in which the touch driving is performed during a period in which the above-described vertical scan is stopped. In this method, for example, in each frame period, every time a fixed number of gate bus lines are selected (in other words, every time video signals are written into the pixel capacitances in the pixel forming sections corresponding to the fixed number of gate bus lines), the vertical scan is temporarily stopped, and the touch driving is performed during the stop period of the vertical scan. More specifically, for example, in a liquid crystal display device provided with a display portion in which 1200 gate bus lines are provided, the touch driving (driving of the sensor electrode) is performed every time 200 of the gate bus lines are selected. In this example, as illustrated in FIG. 24, the touch driving is performed at the same timing in each frame. Note that, in FIG. 24, in each frame period, TP1 to TP5 represent first touch detection timing to fifth touch detection timing (periods in which the sensor electrode is driven to detect the touch position), respectively, and VBK represents a vertical blanking period.

However, when the touch driving is performed at the same timing in each frame, stripe-shaped unevenness may become visible in the vicinity of the gate bus line related to the stopping of the vertical scan. For example, in the case described above in which the touch driving is performed every time the 200 gate bus lines are selected, as schematically illustrated in FIG. 25, the stripe-shaped unevenness appears once every 200 lines (note that the unevenness is exaggerated in FIG. 25 for convenience of description). Such stripe-shaped unevenness easily becomes visible, especially when a solid screen having an intermediate gray-scale is displayed.

Thus, an object of the following disclosure is to suppress occurrence of stripe-shaped unevenness in an active matrix liquid crystal display device with a built-in touch sensor.

(1) A driving method (a driving method of a liquid crystal display device) according to some embodiments of the disclosure is a driving method for a liquid crystal display device that includes a plurality of video signal lines configured to transmit a video signal, a plurality of scanning signal lines intersecting the plurality of video signal lines, a liquid crystal panel including a display portion including pixel forming sections provided in a matrix shape in a plurality of rows and a plurality of columns in correspondence to the plurality of video signal lines and the plurality of scanning signal lines, and a sensor electrode for touch position detection built into the liquid crystal panel. The driving method includes a scanning signal line driving step of scanning the plurality of scanning signal lines one by one, to write the video signal, via a corresponding video signal line of the plurality of video signal lines, into each of the pixel forming sections provided in the plurality of rows and the plurality of columns, and driving the sensor electrode for touch position detection after the scanning of a scanning signal line of the plurality of scanning signal lines is stopped. A stop row that is a row where the scanning of the scanning signal line is stopped in the driving the sensor electrode is different in a first frame period and a second frame period, the first and second frame periods being two consecutive frame periods.

(2) Further, a driving method according to some of embodiments of the disclosure includes the configuration of (1) described above, and in the driving method, when K is an integer of 3 or greater, the stop row is mutually different in each of K consecutive frame periods.

(3) Further, a driving method according to some of embodiments of the disclosure includes the configuration of (2) described above, and in the driving method, when N is an integer of 1 or greater and (K−1) or less, an interval between the stop row in an N-th frame period of the K consecutive frame periods and the stop row in an (N+1)-th frame period of the K consecutive frame periods is identical for all of N.

(4) Further, a driving method according to some of embodiments of the disclosure includes any one of the configurations of (1) to (3) described above, and in the driving method, sensor driving processing of driving the sensor electrode in the driving the sensor electrode is performed three or more times in each frame period.

(5) Further, a driving method according to some of embodiments of the disclosure includes the configuration of (4) described above, and in the driving method, when P is an integer of 3 or greater, the sensor driving processing is performed P times in each frame period, and Q is an integer of 1 or greater and (P−1) or less, in each frame period, an interval between the stop row in the Q-th sensor driving processing and the stop row in the (Q+1)-th sensor driving processing is identical for all of Q.

(6) Further, a liquid crystal display device according to some of embodiments of the disclosure is a liquid crystal display device that a plurality of video signal lines configured to transmit a video signal, a plurality of scanning signal lines intersecting the plurality of video signal lines, a liquid crystal panel including a display portion including pixel forming sections provided in a matrix shape in a plurality of rows and a plurality of columns in correspondence to the plurality of video signal lines and the plurality of scanning signal lines, and a sensor electrode for touch position detection built into the liquid crystal panel. The liquid crystal display device includes a scanning signal line drive circuit configured to scan the plurality of scanning signal lines one by one, to write, via a corresponding video signal line of the plurality of video signal lines, the video signal into each of the pixel forming sections provided in the plurality of rows and the plurality of columns, a sensor electrode drive circuit configured to drive the sensor electrode, and a control circuit configured to control operation of the scanning signal line drive circuit and operation of the sensor electrode drive circuit. The control circuit controls the operation of the scanning signal line drive circuit to cause the scanning of a scanning signal line of the plurality of scanning signal lines to be stopped at mutually different rows in each of a first frame period and a second frame period, the first and second frame periods being two consecutive frame periods, and controls the operation of the sensor electrode drive circuit to cause the sensor electrode to be driven during a period in which the scanning of the scanning signal lines is stopped.

According to a driving method (a driving method for a liquid crystal display device) according to some of embodiments of the disclosure, although the plurality of scanning signal lines are scanned one by one in order to write the video signal into the plurality of pixel forming sections provided in the matrix shape, the driving of the sensor electrode for touch position detection is performed in a state in which the scanning of the scanning signal lines is stopped. In this regard, the stop row that is the row where the scanning of the scanning signal lines is stopped in order to drive the sensor electrode is different in the first frame period and the second frame period, the first and second frame periods being the two consecutive frame periods. As a result, when focusing on each frame period, when a solid screen having an intermediate gray-scale is displayed on the display portion, the transmittance is different between the pixel forming sections corresponding to the stop rows and the pixel forming sections corresponding to the rows other than the stop rows. However, since the stop rows are shifted when the frame periods are switched, an image having uniform brightness over the entire area and having no stripe-shaped unevenness is visually perceived by the human eye. As described above, occurrence of the stripe-shaped unevenness is suppressed in an active matrix liquid crystal display device with a built-in touch sensor.

BRIEF DESCRIPTION OF DRAWINGS

The disclosure will be described with reference to the accompanying drawings, wherein like numbers reference like elements.

FIG. 16 is a signal waveform diagram for describing an example of operation, at a stage other than the selected stage, of the state storage portion when the vertical scan is under way, in the embodiment.

DESCRIPTION OF EMBODIMENTS

0. Basic Study

Before describing an embodiment, a cause of the above-described stripe-shaped unevenness will be described. Note that, here, a focus is placed on the above-described example, that is, an example in which the 1200 gate bus lines are provided and touch driving is performed every time the 200 gate bus lines are selected.

Figure 2:
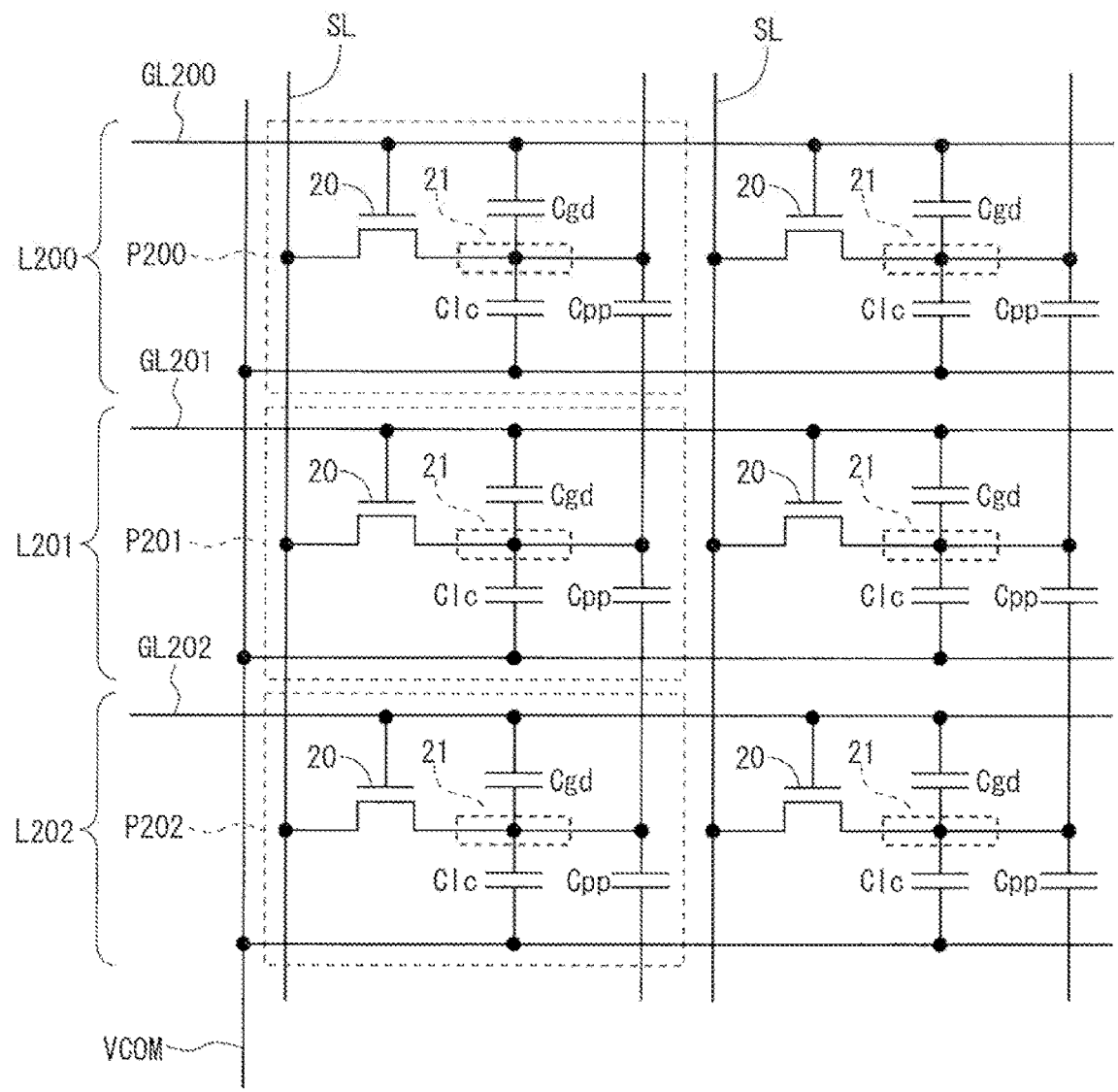
FIG. 2 is a circuit diagram illustrating a configuration of pixel forming sections for 3 rows×2 columns.

First, a configuration of a pixel forming section in a display portion of a liquid crystal display device will be described. FIG. 2 illustrates a configuration of the pixel forming sections for 3 rows×2 columns. Note that, in FIG. 2, a region corresponding to the 200th row is denoted by a reference sign L200, a region corresponding to the 201st row is denoted by a reference sign L201, and a region corresponding to the 202nd row is denoted by a reference sign L202. Further, the gate bus lines corresponding to the 200th to 202nd rows are denoted by reference signs GL200 to GL202, respectively, the pixel forming sections corresponding to the 200th to 202nd rows of the left column are denoted by reference signs P200 to P202, respectively, source bus lines are each denoted by a reference sign SL, and a common electrode is denoted by a reference sign VCOM. As can be seen from FIG. 2, each of the pixel forming sections includes a pixel thin film transistor (pixel TFT) 20, a pixel electrode 21, and a liquid crystal capacitance (pixel capacitance) Clc. A gate terminal of the pixel TFT 20 is connected to the corresponding gate bus line GL, a drain terminal of the pixel TFT 20 is connected to the pixel electrode 21, and a source terminal of the pixel TFT 20 is connected to the corresponding source bus line SL. The liquid crystal capacitance Clc is formed by the pixel electrode 21 and the common electrode VCOM. Further, a parasitic capacitance is present in the display portion. In this regard, for convenience of description, in FIG. 2, only a parasitic capacitance Cgd formed between the pixel electrode 21 and the gate bus line GL and a parasitic capacitance Cpp formed between two of the adjacent pixel electrodes 21 are illustrated.

Figure 3:
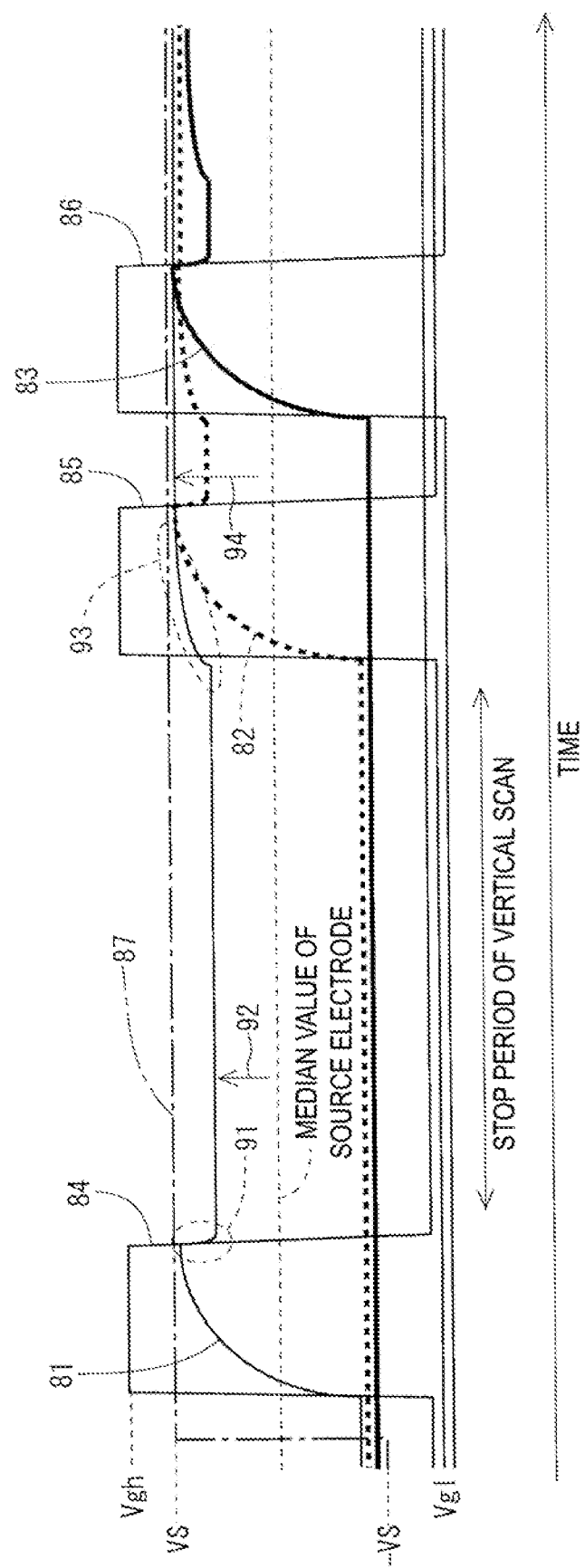
FIG. 3 is a signal waveform diagram for describing a cause of occurrence of stripe-shaped unevenness.

Next, a focus is placed on a change in the pixel potential (potential of the pixel electrode 21) in the pixel forming sections P200 to P202 corresponding to the 200th to 202nd rows (see FIG. 3). In FIG. 3, waveforms representing changes in pixel potentials V(P200), V(P201), and V(P202) in the pixel forming sections P200, P201, and P202 are denoted by reference signs 81, 82, and 83, respectively, waveforms (in other words, waveforms of scanning signals) representing changes in gate potentials G(200), G(201), and G(202) of the pixel TFTs 20 included in the pixel forming sections P200, P201, and P202 are denoted by reference signs 84, 85, and 86, respectively, and a waveform representing a change in a source potential (potential of a video signal) is denoted by a reference sign 87. Note that, for convenience of description, with respect to the source potential, an example is illustrated in which the source potential changes from a potential −VS that is the maximum absolute value on the negative side to a potential VS that is the maximum absolute value on the positive side.

In the pixel forming section P200, when the gate potential G(200) of the pixel TFT 20 changes from a gate low potential Vgl to a gate high potential Vgh, the pixel TFT 20 is turned on. As a result, the pixel potential V(P200) becomes substantially equal to the source potential VS. After that, when the gate potential G(200) of the pixel TFT 20 changes from the gate high potential Vgh to the gate low potential Vgl, the pixel potential V(P200) decreases via the parasitic capacitance Cgd formed between the pixel electrode 21 and the gate bus line GL200 in the pixel forming section P200. In other words, the pixel potential V(P200) decreases due to a so-called feed-through voltage (see the section denoted by a reference sign 91 in FIG. 3). A feed-through voltage ΔVCgd is expressed by Equation (1) described below.

[Equation 1]

$$\Delta VCgd = \frac{Cgd}{Cgd + Cpp + Clc} \times (Vgh - Vgl) \tag{1}$$

Accordingly, the pixel potential V(P200) that has decreased due to the feed-through voltage (the potential of the section indicated by an arrow denoted by a reference sign 92 in FIG. 3) is expressed by Equation (2) described below.

$$V(P200)=VS-\Delta VCgd \quad (2)$$

After the end of a stop period of the vertical scan, in the pixel forming section P201, the gate potential G(201) of the pixel TFT 20 changes from the gate low potential Vgl to the gate high potential Vgh. With this, in the pixel forming section P201, the pixel TFT 20 is turned on, and the pixel potential V(P201) becomes substantially equal to the source potential VS. At this time, the pixel potential V(P200) increases via the parasitic capacitance Cpp formed between the pixel electrode 21 in the pixel forming section P200 and the pixel electrode 21 in the pixel forming section P201 (see the section denoted by a reference sign 93 in FIG. 3). In this regard, a voltage ΔVCpp corresponding to the increased amount of the pixel potential V(P200) (hereinafter referred to as a "push-up voltage") is expressed by Equation (3) described below.

[Equation 2]

$$\Delta VCpp = \frac{Cpp}{Cgd + Cpp + Clc} \times (VS + VS) \quad (3)$$

Accordingly, the pixel potential V(P200) that has increased due to the push-up voltage (the potential of the section indicated by an arrow denoted by a reference sign 94 in FIG. 3) is expressed by Equation (4) described below.

$$V(P200)=VS-\Delta VCgd+\Delta VCpp \quad (4)$$

After that, in the pixel forming section P200, the pixel potential V(P200) expressed by Equation (4) described above is held throughout a period in which the gate potential G(200) of the pixel TFT 20 changes from the gate low potential Vgl to the gate high potential Vgh in the next frame period.

In the pixel forming section P201 and the pixel forming section P202 also, in a similar manner, the pixel potential decreases from the potential substantially equal to the source potential VS to the potential expressed by Equation (2) described above due to the feed-through voltage, and then, increases to the potential expressed by Equation (4) described above due to the push-up voltage.

Figure 4:
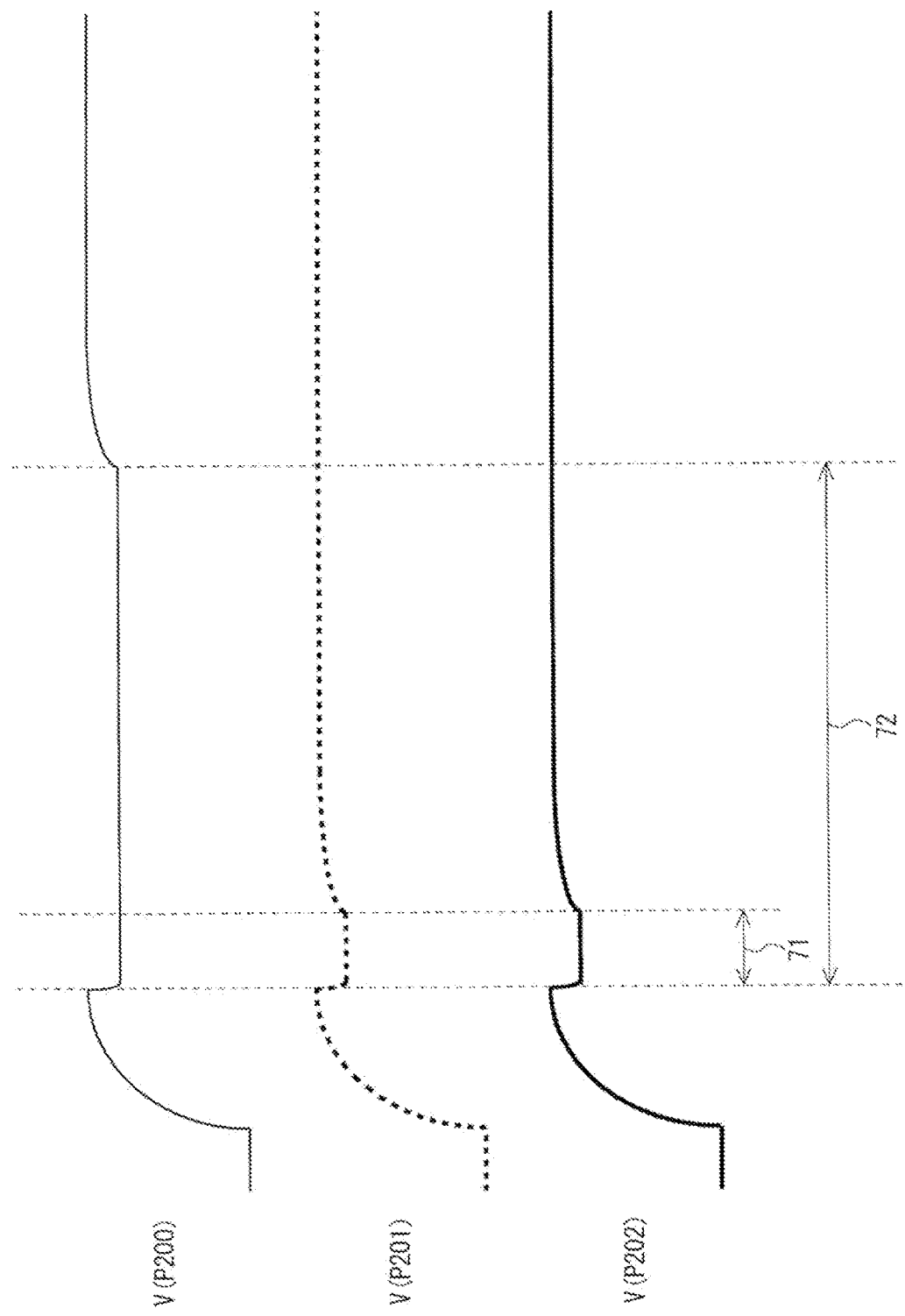
FIG. 4 is a signal waveform diagram for describing the cause of occurrence of the stripe-shaped unevenness.

Incidentally, in this example, as illustrated in FIG. 3, after the gate bus line GL200 corresponding to the 200th row is selected, there is the stop period of the vertical scan. Therefore, in the pixel forming sections P201 and P202, the length of the period (the period indicated by an arrow denoted by a reference sign 71 in FIG. 4) in which the pixel potential expressed by Equation (2) described above is held is very short, whereas in the pixel forming section P200, the length of the period (the period indicated by an arrow denoted by a reference sign 72 in FIG. 4) is relatively long. In this way, the length of the period in which the pixel potential expressed by Equation (2) described above is held is longer in the pixel forming section P200 than in the pixel forming sections P201 and P202. Therefore, the liquid crystal effective voltage in the pixel forming section P200 becomes smaller than the liquid crystal effective voltage in the pixel forming sections P201 and P202.

As described above, in the case in which the touch driving is performed every time the 200 gate bus lines are selected, when display of a solid screen having an intermediate gray-scale is performed, the liquid crystal effective voltage in the pixel forming sections corresponding to the 200th, 400th, 600th, 800th, and 1000th rows becomes smaller than the liquid crystal effective voltage in the other pixel forming sections. In other words, the transmittance in the pixel forming sections corresponding to the 200th, 400th, 600th, 800th, and 1000th rows becomes smaller than the transmittance in the other pixel forming sections. As a result, as described above, the stripe-shaped unevenness appears every 200 lines. In this way, when the touch driving is performed at the same timing in each frame, the stripe-shaped unevenness becomes visible in the vicinity of the gate bus line related to the stopping of the vertical scan. Note that such stripe-shaped unevenness becomes visible more easily when the percentage of the parasitic capacitance Cpp in the total capacitance of the pixel increases. That percentage increases as the display portion is improved to have a higher definition.

Based on the description above, in the following embodiment, a driving method is adopted in which touch detection timing is made different in each frame period.

An embodiment will be described below. Note that, with respect to an n-channel thin film transistor, of the drain and the source, whichever has a higher potential is called the drain, but among thin film transistors provided in unit circuits described below, there are some thin film transistors in which the drain and the source are switched between each other during operation. Thus, in the following description, one of two terminals that function as the drain and/or the source is referred to as a "first conduction terminal" and the other is referred to as a "second conduction terminal". A terminal that functions as the gate of the thin film transistor is referred to as a "control terminal".

1. OVERALL CONFIGURATION AND OPERATION OUTLINE

Figure 5:
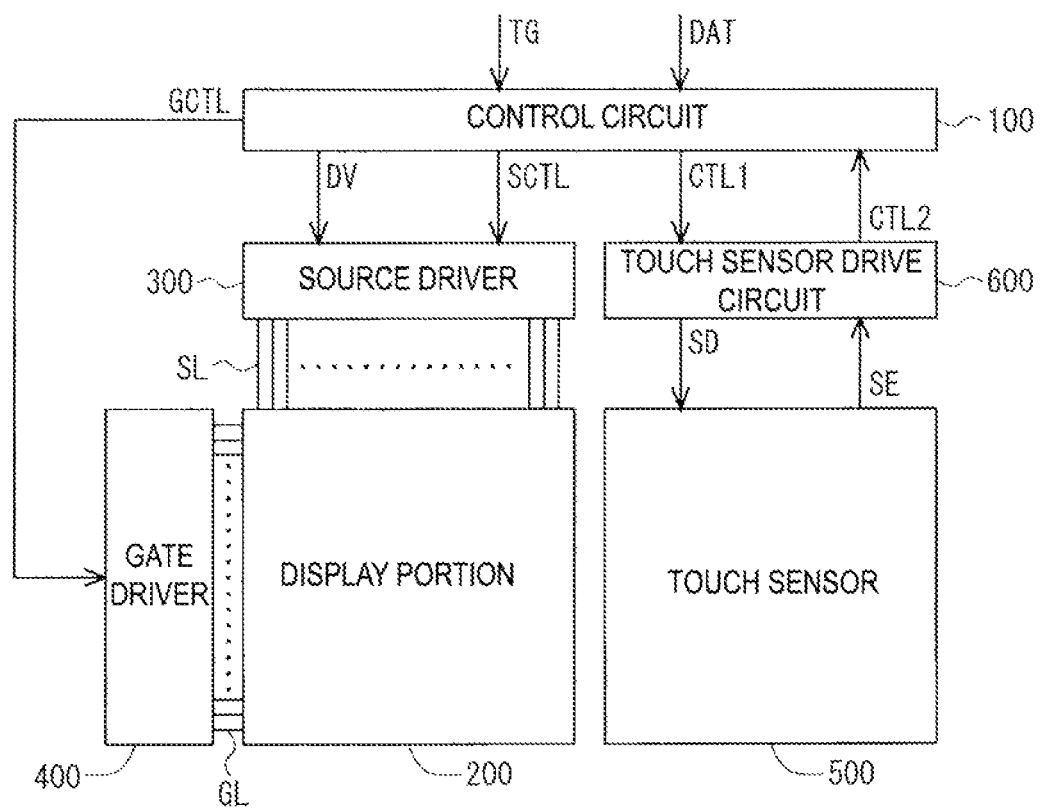
FIG. 5 is a block diagram illustrating an overall configuration of an active matrix liquid crystal display device according to the embodiment.

FIG. 5 is a block diagram illustrating an overall configuration of an active matrix liquid crystal display device according to an embodiment. This liquid crystal display device includes a control circuit 100, a display portion 200, a source driver (a video signal line drive circuit) 300, a gate driver (a scanning signal line drive circuit) 400, a touch sensor 500, and a touch sensor drive circuit 600. Note that FIG. 5 is a diagram illustrating a functional configuration, and thus, the positional relationships between constituent elements, and the like are different from actual relationships, and the like.

In the display portion 200, a plurality of the source bus lines (video signal lines) SL and a plurality of the gate bus lines (scanning signal lines) GL are disposed. The pixel forming section that forms a pixel is provided corresponding to each of intersections between the plurality of source bus lines SL and the plurality of gate bus lines GL. In other words, the display portion 200 includes a plurality of the pixel forming sections. The plurality of pixel forming sections constitute a pixel matrix. Note that the configuration of the pixel forming section is as illustrated in FIG. 2.

Figure 6:
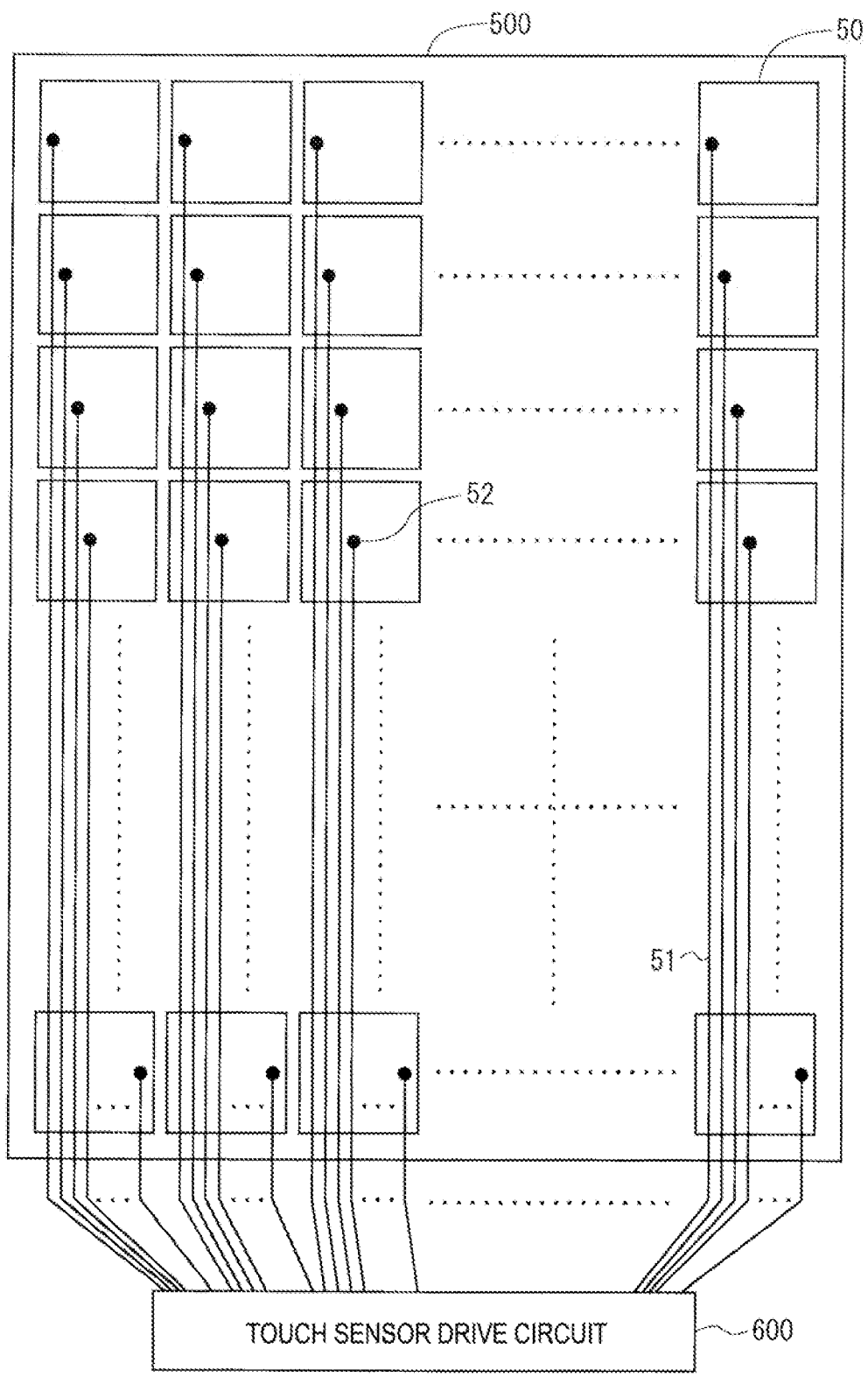
FIG. 6 is a diagram illustrating a configuration example of a touch sensor of the embodiment.

FIG. 6 is a diagram illustrating a configuration example of the touch sensor 500. As illustrated in FIG. 6, the touch sensor 500 is constituted by a sensor electrode 50 having a rectangular shape and segmented into a plurality of rows and a plurality of columns. Incidentally, a liquid crystal panel constituting the liquid crystal display device according to the present embodiment is constituted by a thin film transistor array substrate (TFT array substrate) and a color filter substrate, which are two glass substrates provided facing each other while sandwiching liquid crystal therebetween. Of the two glass substrates, on the TFT array substrate, the sensor electrode 50, sensor electrode wiring lines 51, and contact portions 52 that connect the sensor electrode 50 and the sensor electrode wiring lines 51 are provided. A configuration can also be adopted in which the sensor electrode 50 is also used as a common electrode for image display. As described above, the liquid crystal display device according to the present embodiment is a liquid crystal display device provided with an in-cell touch panel, that is, a liquid crystal display device with a built-in touch sensor. Note that the configuration of the touch sensor is not particularly limited, and a touch sensor having a configuration other than the configuration illustrated in FIG. 6 can also be used.

Next, operation of the constituent elements illustrated in FIG. 5 will be described. The control circuit 100 controls operation of the source driver 300, the gate driver 400, and the touch sensor drive circuit 600. More specifically, the control circuit 100 receives image data DAT and a group of timing signals (such as a horizontal synchronization signal and a vertical synchronization signal) TG, both of which are transmitted from the outside, receives a control signal CTL2 transmitted from the touch sensor drive circuit 600, and outputs a digital video signal DV, a source control signal SCTL that controls the operation of the source driver 300, and a gate control signal GCTL that controls the operation of the gate driver 400. The control circuit 100 also provides a control signal CTL1 to the touch sensor drive circuit 600. Note that the source control signal SCTL includes a source start pulse signal, a source clock signal, a latch strobe signal, and the like, and the gate control signal GCTL includes a gate start pulse signal, a gate clock signal, and the like.

The source driver 300 applies a driving video signal to each of the source bus lines SL on the basis of the digital video signal DV and the source control signal SCTL transmitted from the control circuit 100. At this time, the source driver 300 sequentially holds the digital video signals DV indicating respective voltages to be applied to the corresponding source bus lines SL at timing when pulses of the source clock signal are generated. Then the held digital video signals DV are converted into analog voltages at timing at which pulses of the latch strobe signal are generated. The converted analog voltages are concurrently applied to all of the source bus lines SL as the driving video signals.

The gate driver 400 repeats application of an active scanning signal to each of the gate bus lines GL in one vertical scanning period as a cycle, on the basis of the gate control signal GCTL transmitted from the control circuit 100. In other words, the gate driver 400 performs the vertical scan (sequentially selects the gate bus lines GL one by one from the gate bus line GL at the first row to the gate bus line GL at the last row). However, when the sensor electrode 50 is driven to detect a touch position, the gate driver 400 stops the vertical scan. In this way, the gate driver 400 according to the present embodiment is configured to be able to stop the vertical scan. Note that the gate driver 400 will be described below in detail.

The touch sensor drive circuit 600 provides, to the touch sensor 500, a drive signal SD for performing touch detection on the basis of the control signal CTL1 provided from the control circuit 100. As a result, the sensor electrode 50 (see FIG. 6) constituting the touch sensor 500 is driven. Note that the control signal CTL1 is a signal (a signal to control a timing) for causing processing for touch detection to be performed during a period in which processing for image display is not performed (in other words, during a period in which the vertical scan is stopped). When a detection signal SE is provided from the touch sensor 500 to the touch sensor drive circuit 600 as a detection result, the touch sensor drive circuit 600 detects the touch position with respect to the touch sensor 500 on the basis of the detection signal SE. Then, the touch sensor drive circuit 600 provides the control signal CTL2 to the control circuit 100 so that processing according to the touch position is performed. Note that a sensor electrode drive circuit is realized by this touch sensor drive circuit 600.

As described above, the driving video signals are applied to the source bus lines SL, and the scanning signals are applied to the gate bus lines GL. As a result, an image based on the image data DAT transmitted from the outside is displayed on the display portion 200. Further, the processing according to the touch position with respect to the touch sensor 500 is performed in this liquid crystal display device.

2. GATE DRIVER

Next, the gate driver 400 will be described. Note that a configuration to be described here is an example, and the specific configuration is not particularly limited as long as the vertical scan can be stopped in the middle of scanning the first row to the i-th row (see also a fourth modified example).

Figure 7:
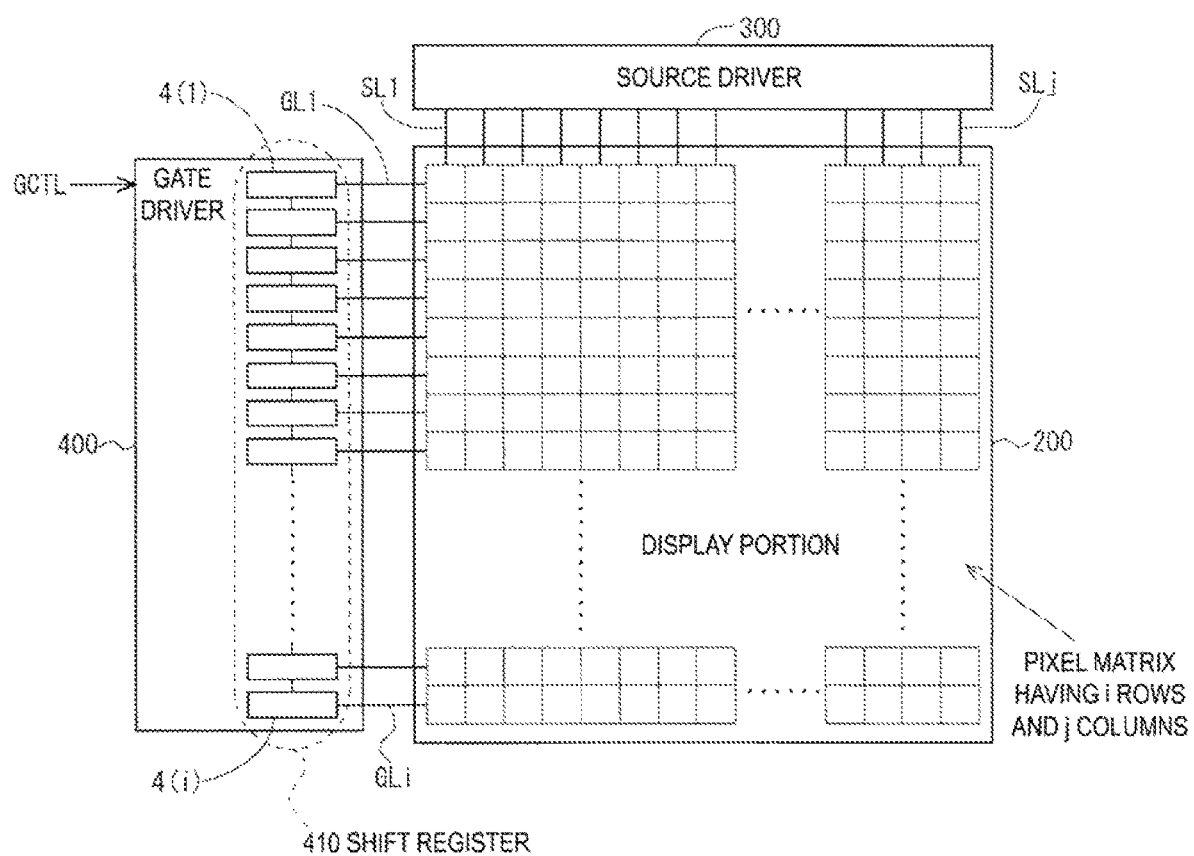
FIG. 7 is a block diagram for describing a configuration of a gate driver of the embodiment.

FIG. 7 is a block diagram for describing a configuration of the gate driver 400 according to the present embodiment. As illustrated in FIG. 7, the gate driver 400 is constituted by a shift register 410 having a plurality of stages. The display portion 200 includes a pixel matrix formed in i rows×j columns, and each of the stages of the shift register 410 is provided corresponding to each row of the pixel matrix in a one-to-one manner. In other words, the shift register 410 includes i unit circuits 4(1) to 4(i). Note that, although the unit circuit may be provided as a dummy stage before the first stage or after the i-th stage, this matter is not directly related to the subject matter of the disclosure, and thus, the description thereof is omitted. The configuration and the operation of the gate drivers 400 will be described below in detail.

2.1 Overall Configuration and Operation of Shift Register

Figure 8:
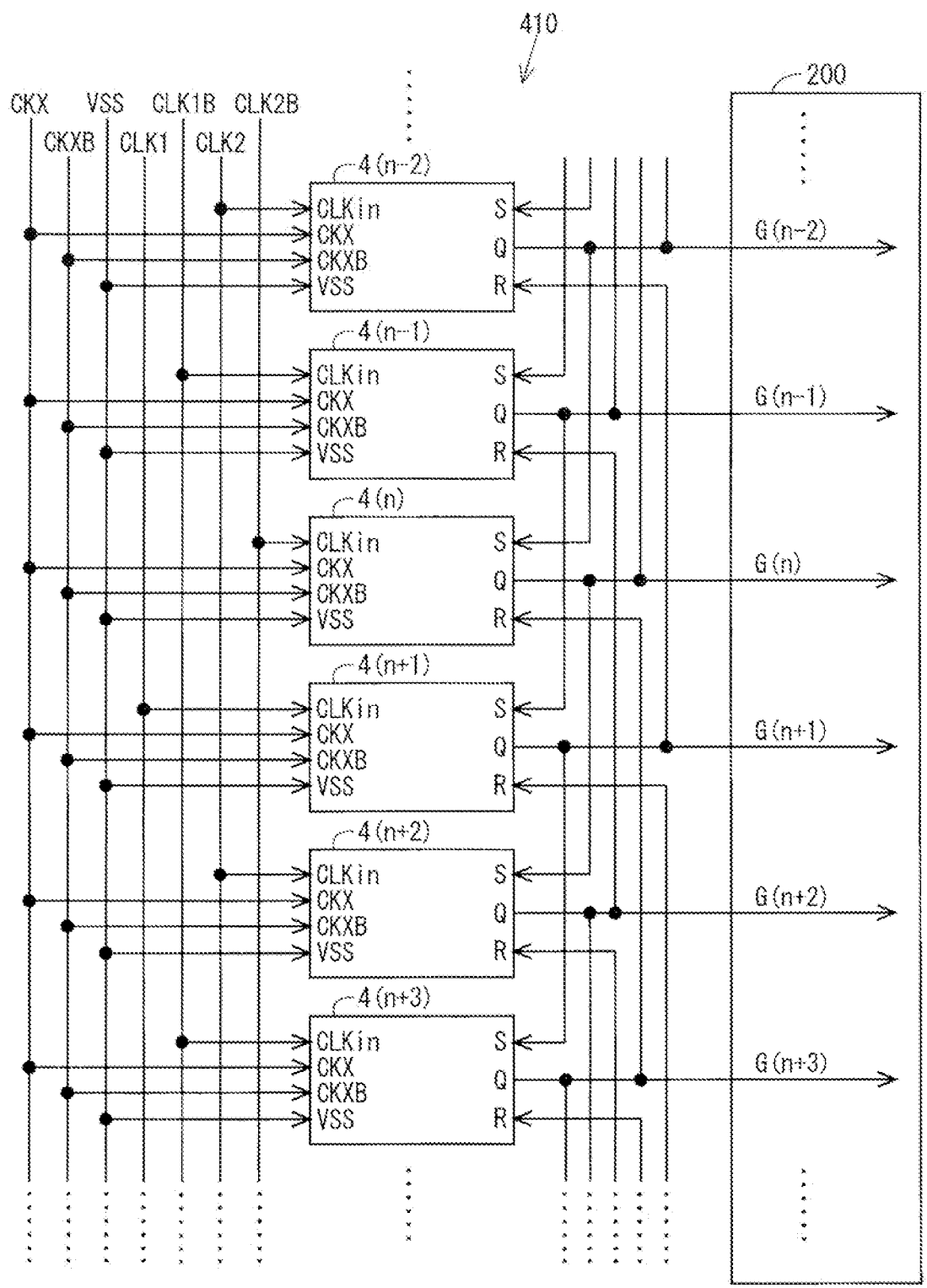
FIG. 8 is a block diagram illustrating a configuration of a shift register in the gate driver of the embodiment.

FIG. 8 is a block diagram illustrating a configuration of the shift register 410 in the gate driver 400. As described above, the shift register 410 is constituted by i unit circuits 4(1) to 4(i). Note that, in FIG. 8, the unit circuits 4(n−2) to 4(n+3) provided at the (n−2)-th stage to the (n+3)-th stage are illustrated. In the following description, the unit circuit is denoted by a reference sign 4 when there is no need to distinguish the i unit circuits 4(1) to 4(i) from each other.

As the gate control signals GCTL, a gate start pulse signal GSP (not illustrated in FIG. 8), a clear signal CLR (not illustrated in FIG. 8), gate clock signals CLK1, CLK1B, CLK2, and CLK2B, and control clock signals CKX and CKXB are provided to the shift register 410. Further, a direct current (DC) power supply voltage VSS is also applied to the shift register 410. The gate clock signals CLK1, CLK1B, CLK2, and CLK2B are four-phase clock signals. Note that, of the four-phase clock signals, a clock signal input to each of the unit circuits 4 (hereinafter referred to as an "input clock signal") is denoted by a reference sign CLKin. The control clock signals CKX and CKXB are two-phase clock signals.

Signals described below are provided to input terminals of each of the stages (each of the unit circuits 4) of the shift register 410 (see FIG. 8). As for the gate clock signals, the gate clock signal CLK2 is provided to the unit circuit 4(n−2) at the (n−2)-th stage, the gate clock signal CLK1B is provided to the unit circuit 4(n−1) at the (n−1)-th stage, the gate clock signal CLK2B is provided to the unit circuit 4(n) at the n-th stage, and the gate clock signal CLK1 is provided to the unit circuit 4(n+1) at the (n+1)-th stage. Such a configuration is repeated for four stages throughout all stages of the shift register 410. Note that the phase of the gate clock signal CLK1 is shifted by 180 degrees with respect to the phase of the gate clock signal CLK1B, the phase of the gate clock signal CLK2 is shifted by 180 degrees with respect to the phase of the gate clock signal CLK2B, and the phase of the gate clock signal CLK1 is advanced by 90 degrees from the phase of the gate clock signal CLK2. Further, with respect to a unit circuit 4(k) at a chosen stage (k-th stage in this case), an output signal Q(k−2) output from a unit circuit 4(k−2) at a stage two stages prior to the chosen stage is provided as a set signal S, and an output signal Q(k+3) output from a unit circuit 4(k+3) at a stage three stages after the chosen stage is provided as a reset signal R. The control clock signals CKX and CKXB and the DC power supply voltage VSS are commonly provided to all the unit circuits 4(1) to 4(i).

The output signal Q is output from an output terminal at each of the stages (each of the unit circuits 4) of the shift register 410 (see FIG. 8). The output signal Q output from the chosen stage (k-th stage in this case) is provided to a gate bus line GL(k) as a scanning signal G(k). In addition, the output signal Q is provided to a unit circuit 4(k−3) at a stage three stages prior to the chosen stage as the reset signal R, and provided to a unit circuit 4(k+2) at a stage two stages after the chosen stage as the set signal S.

Figure 9:
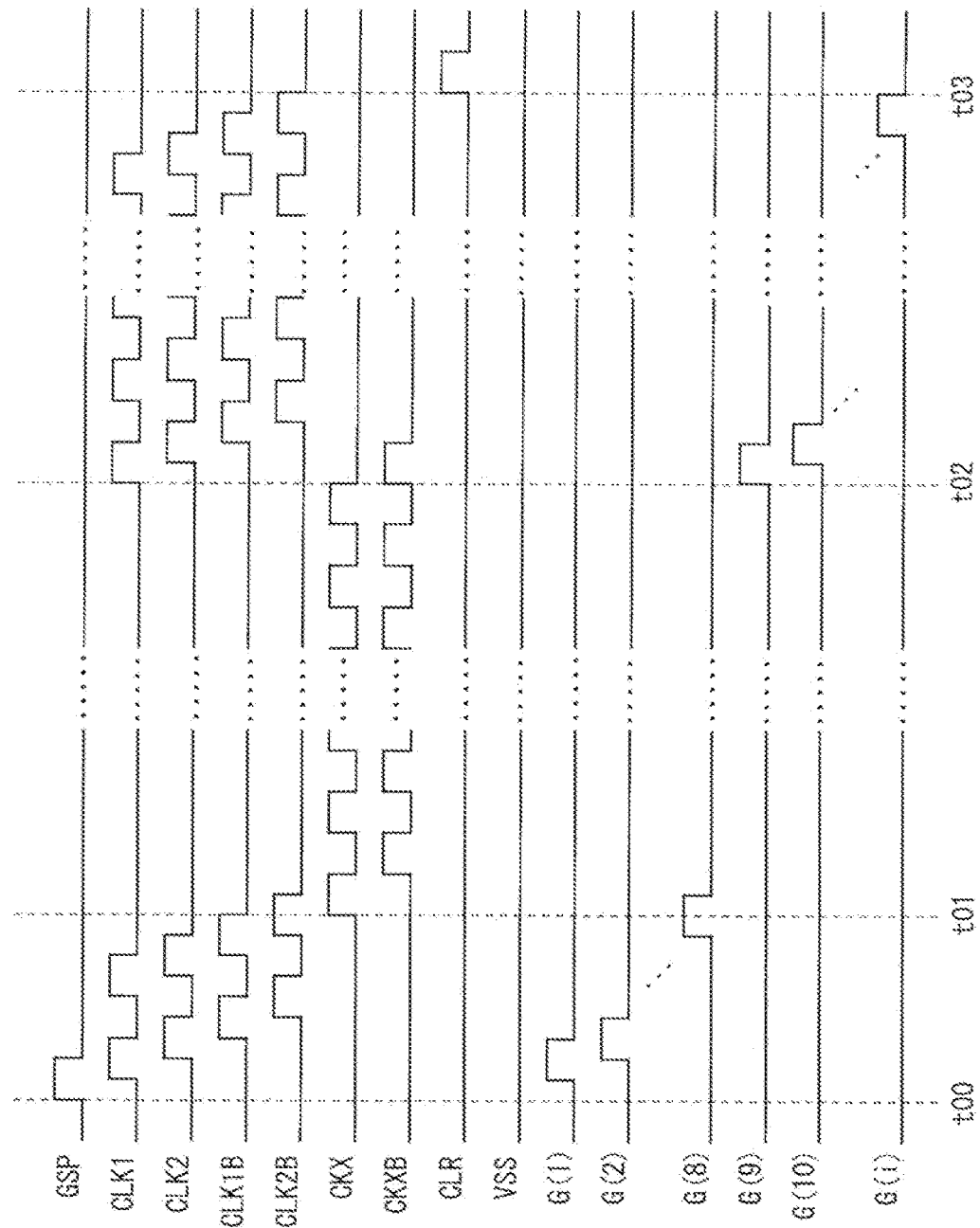
FIG. 9 is a signal waveform diagram for describing operation of the gate driver of the embodiment.

FIG. 9 is a signal waveform diagram for describing the operation of the gate driver 400. In the configuration described above, when a pulse of the gate start pulse signal GSP is provided to the shift register 410 at a time t00, on the basis of a clock operation of the gate clock signals CLK1, CLK2, CLK1B, and CLK2B, shift pulses included in the output signals Q output from each of the unit circuits 4 are sequentially transferred from the unit circuit 4(1) at the first stage to the unit circuit 4(i) at the i-th stage (in other words, shift operation is performed). Then, in response to the transfer of the shift pulses, the output signals Q output from each of the unit circuits 4 are sequentially set to a high level. As a result, as illustrated in FIG. 9, the scanning signals G(1) to G(i), which are sequentially set to the high level (active) for a predetermined period each time, are provided to gate bus lines GL1 to GLi in the display portion 200, respectively. In other words, the i gate bus lines GL1 to GLi sequentially enter a selected state.

Incidentally, as described above, the gate driver 400 is configured to be able to stop the vertical scan in the middle of the scanning from the 1st row to the i-th row. In an example illustrated in FIG. 9, a period from a time t01 to a time t02 is a period in which the vertical scan is stopped (hereinafter referred to as a "pause period"). During the pause period, the clock operation of the gate clock signals CLK1, CLK2, CLK1B, and CLK2B is stopped, and clock operation of the control clock signals CKX and CKXB is performed. As a result of such operation being performed during the pause period and each of the unit circuits 4 being configured as described below, the vertical scan resumes after the end of the pause period as illustrated in FIG. 9. Note that, during the pause period, the sensor electrode 50 is driven by the touch sensor drive circuit 600 to detect the touch position.

2.2 Unit Circuit
2.2.1 Overview

Figure 10:
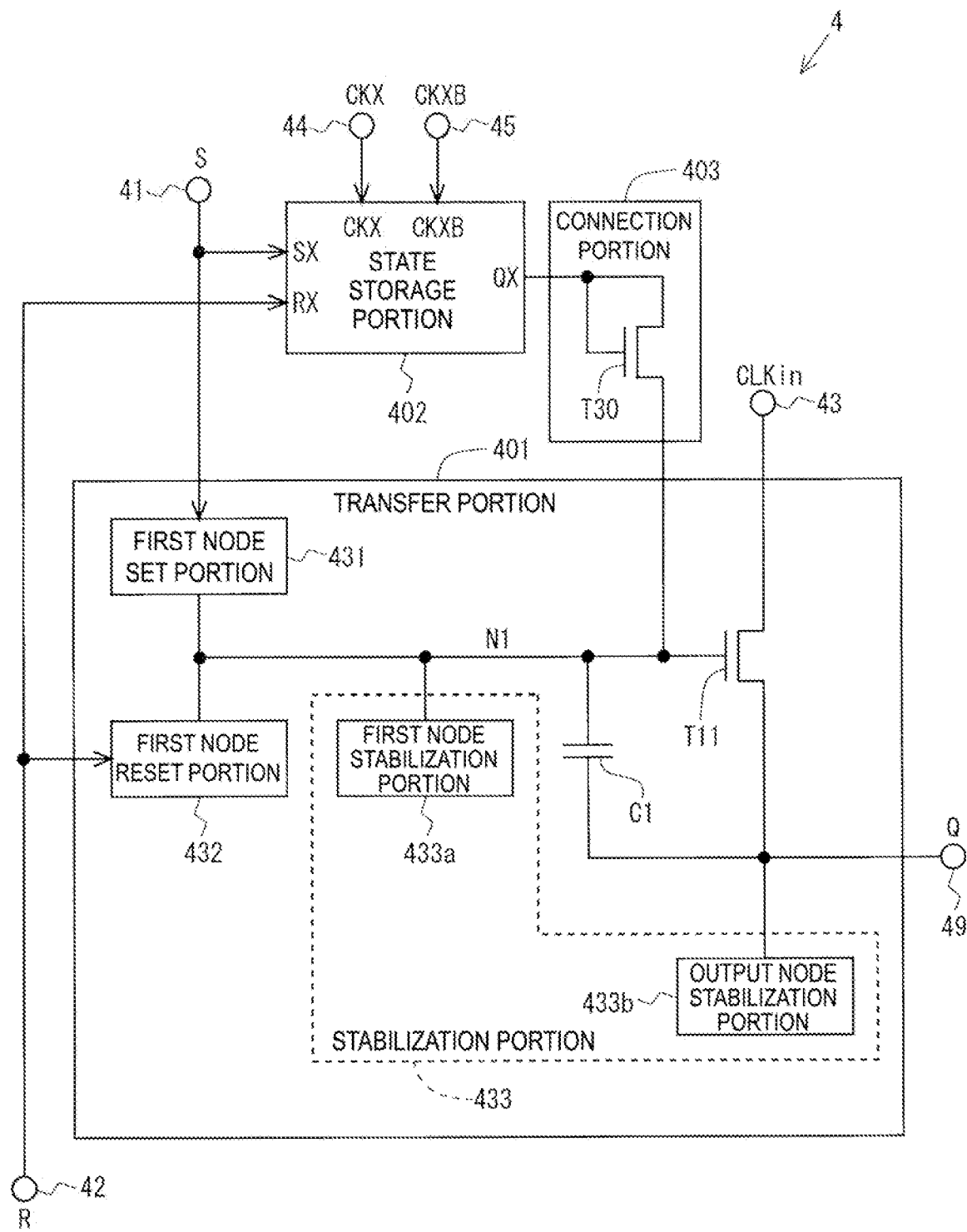
FIG. 10 is a diagram illustrating a schematic configuration of a unit circuit of the embodiment.

FIG. 10 is a diagram illustrating a schematic configuration of the unit circuit 4 according to the present embodiment. As illustrated in FIG. 10, the unit circuit 4 includes a transfer portion 401, a state storage portion 402, and a connection portion 403. In addition to an input terminal for the DC power supply voltage VSS (not illustrated in FIG. 10), the unit circuit 4 includes an input terminal 41 for receiving the set signal S, an input terminal 42 for receiving the reset signal R, an input terminal 43 for receiving the input clock signal CLKin, an input terminal 44 for receiving the control clock signal CKX, an input terminal 45 for receiving the control clock signal CKXB, and an output terminal 49 for outputting the output signal Q. The transfer portion 401 includes a thin film transistor T11, a capacitor (capacitance element) Cl, a first node N1, a first node set portion 431, a first node reset portion 432, and a stabilization portion 433. The stabilization portion 433 includes a first node stabilization portion 433a and an output node stabilization portion 433b. The connection portion 403 includes a thin film transistor T30. Note that detailed configurations of the transfer portion 401 and the state storage portion 402 will be described below.

The first node set portion 431 changes the potential of the first node N1 toward the high level when the set signal S is at the high level. The first node reset portion 432 changes the potential of the first node N1 toward a low level when the reset signal R is at the high level. The first node stabilization portion 433a draws the potential of the first node N1 to the low level during a period in which the potential of the first node N1 is required to be maintained at the low level, so as to prevent an output of an abnormal pulse, which is caused by an increase in the potential of the first node N1. The output node stabilization portion 433b draws the potential of the output terminal 49 to the low level during a period in which the potential of the output terminal 49 is required to be maintained at the low level, so as to prevent the output of the abnormal pulse.

With respect to the thin film transistor T30 in the connection portion 403, an output signal QX from the state storage portion 402 is provided to a control terminal and a first conduction terminal thereof, and a second conduction terminal thereof is connected to the first node N1 in the transfer portion 401. With such a configuration, when the output signal QX is at the high level, the thin film transistor T30 is turned on. Then, when the thin film transistor T30 is turned on, a charge is supplied to the first node N1 on the basis of the output signal QX at the high level. In this way, the connection portion 403 connects the state storage portion 402 and the transfer portion 401, so that the charge based on the output signal QX at the high level (on level) output from the state storage portion 402 is supplied to the first node N1 in the transfer portion 401.

2.2.2 Configuration of State Storage Portion

Figure 11:
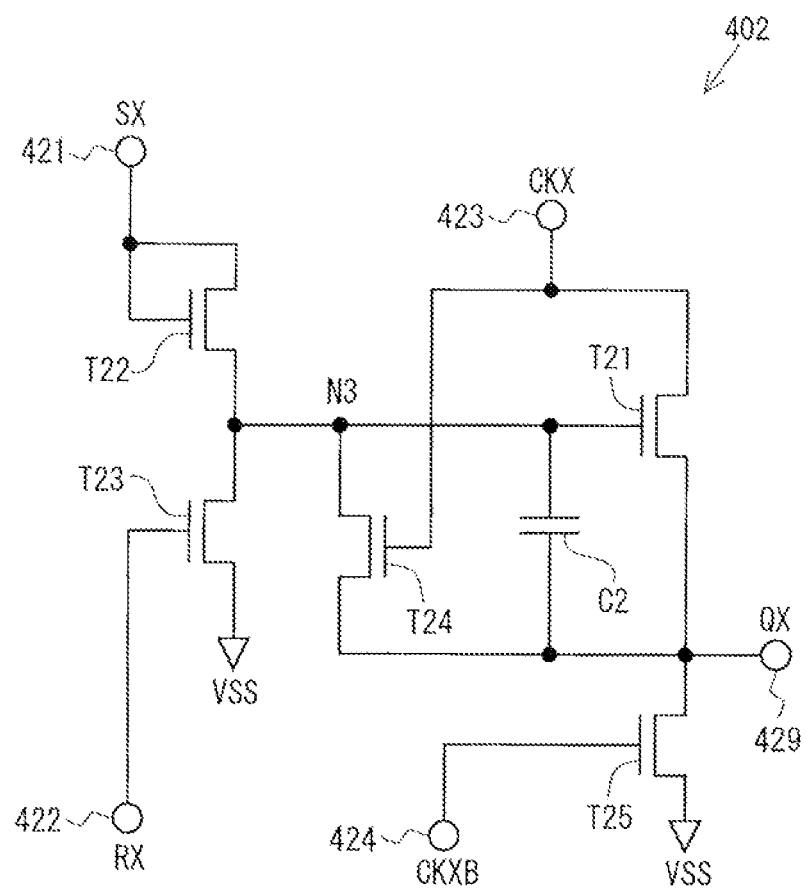
FIG. 11 is a circuit diagram illustrating a specific configuration of a state storage portion in the unit circuit of the embodiment.

FIG. 11 is a circuit diagram illustrating a specific configuration of the state storage portion 402 in the unit circuit 4. As illustrated in FIG. 11, the state storage portion 402 includes five thin film transistors T21 to T25 and one capacitor (capacitance element) C2. Further, in addition to an input terminal for the DC power supply voltage VSS, the state storage portion 402 includes four input terminals 421 to 424 and one output terminal 429. Here, the input terminal for receiving a set signal SX is denoted by a reference sign 421, the input terminal for receiving a reset signal RX is denoted by a reference sign 422, the input terminal for receiving the control clock signal CKX is denoted by a reference sign 423, and the input terminal for receiving the control clock signal CKXB is denoted by a reference sign 424.

Note that the set signal S provided to the unit circuit 4 and the set signal SX provided to the state storage portion 402 are the same signals, but the set signal provided to the state storage portion 402 is denoted by a reference sign SX for convenience. Further, the input terminal 421 is substantially the same terminal as the input terminal 41 in FIG. 10, the input terminal 422 is substantially the same terminal as the input terminal 42 in FIG. 10, the input terminal 423 is substantially the same terminal as the input terminal 44 in FIG. 10, and the input terminal 424 is substantially the same terminal as the input terminal 45 in FIG. 10.

Next, a connection relationship between the constituent elements in the state storage portion 402 will be described. A control terminal of the thin film transistor T21, a second conduction terminal of the thin film transistor T22, a first conduction terminal of the thin film transistor T23, a first conduction terminal of the thin film transistor T24, and one end of the capacitor C2 are connected to each other. Note that a region (wiring line) in which they are connected to each other is referred to as a "third node". The third node is denoted by a reference sign N3.

As for the thin film transistor T21, the control terminal thereof is connected to the third node N3, a first conduction terminal thereof is connected to the input terminal 423, and a second conduction terminal thereof is connected to the output terminal 429. As for the thin film transistor T22, a control terminal and a first conduction terminal thereof are connected to the input terminal 421 (in other words, are in a diode connection state), and the second conduction terminal thereof is connected to the third node N3. As for the thin film transistor T23, a control terminal thereof is connected to the input terminal 422, the first conduction terminal thereof is connected to the third node N3, and a second conduction terminal thereof is connected to the input terminal for the DC power supply voltage VSS. As for the thin film transistor T24, a control terminal thereof is connected to the input terminal 423, the first conduction terminal thereof is connected to the third node N3, and the second conduction terminal thereof is connected to the output terminal 429. As for the thin film transistor T25, a control terminal thereof is connected to the input terminal 424, a first conduction terminal thereof is connected to the output terminal 429, and a second conduction terminal thereof is connected to the input terminal for the DC power supply voltage VSS. The capacitor C2 is connected to the third node N3 at one end and connected to the output terminal 429 at the other end.

2.2.3 Configuration of Transfer Portion

Figure 12:
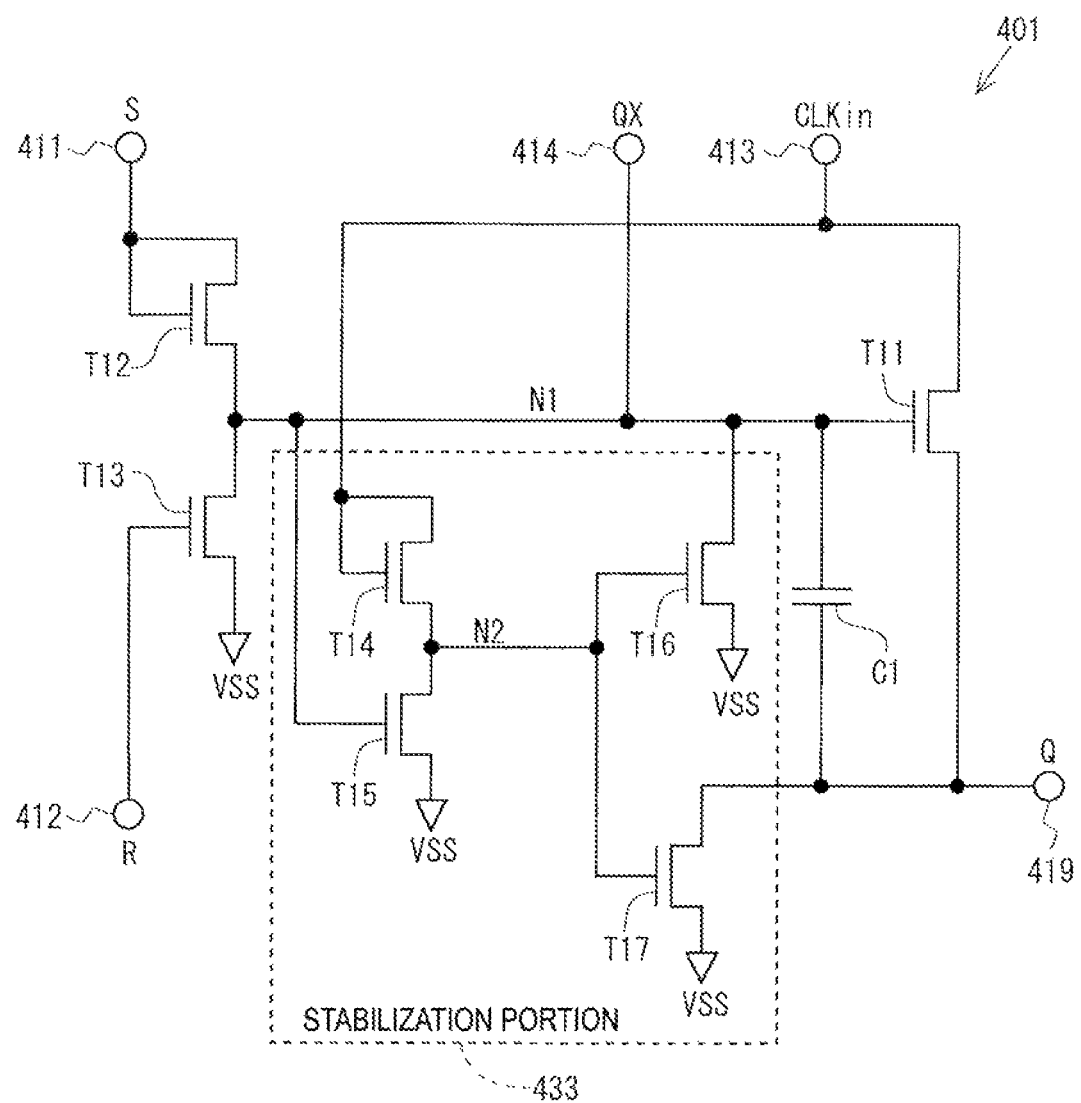
FIG. 12 is a circuit diagram illustrating a specific configuration of a transfer portion in the unit circuit of the embodiment.

FIG. 12 is a circuit diagram illustrating a specific configuration of the transfer portion 401 in the unit circuit 4. As illustrated in FIG. 12, the transfer portion 401 includes seven thin film transistors T11 to T17 and one capacitor (capacitance element) C1. Further, the transfer portion 401 also includes an input terminal for the DC power supply voltage VSS, four input terminals 411 to 414, and one output terminal 419. Here, the input terminal for receiving the set signal S is denoted by a reference sign 411, the input terminal for receiving the reset signal R is denoted by a reference sign 412, the input terminal for receiving the input clock signal CLKin is denoted by a reference sign 413, and the input terminal for receiving the output signal QX from the state storage portion 402 is denoted by a reference sign 414.

Note that the input terminal 411 is substantially the same terminal as the input terminal 41 in FIG. 10, the input terminal 412 is substantially the same terminal as the input terminal 42 in FIG. 10, the input terminal 413 is substantially the same terminal as the input terminal 43 in FIG. 10, and the output terminal 419 is substantially the same terminal as the output terminal 49 in FIG. 10.

Next, a connection relationship between the constituent elements in the transfer portion 401 will be described. A control terminal of the thin film transistor T11, a second conduction terminal of the thin film transistor T12, a first conduction terminal of the thin film transistor T13, a control terminal of the thin film transistor T15, a first conduction terminal of the thin film transistor T16, the input terminal 414, and one end of the capacitor C1 are connected to each other via the first node N1. A second conduction terminal of the thin film transistor T14, a first conduction terminal of the thin film transistor T15, a control terminal of the thin film transistor T16, and a control terminal of the thin film transistor T17 are connected to each other. Note that a region (wiring line) in which they are connected to each other is referred to as a "second node". The second node is denoted by a reference sign N2.

As for the thin film transistor T11, the control terminal thereof is connected to the first node N1, a first conduction terminal thereof is connected to the input terminal 413, and a second conduction terminal thereof is connected to the output terminal 419. As for the thin film transistor T12, a control terminal and a first conduction terminal thereof are connected to the input terminal 411 (in other words, are in the diode connection state), and the second conduction terminal thereof is connected to the first node N1. As for the thin film transistor T13, a control terminal thereof is connected to the input terminal 412, the first conduction terminal thereof is connected to the first node N1, and a second conduction terminal thereof is connected to the input terminal for the DC power supply voltage VSS. As for the thin film transistor T14, a control terminal and a first conduction terminal thereof are connected to the input terminal 413 (in other words, are in the diode connection state), and the second conduction terminal thereof is connected to the second node N2. As for the thin film transistor T15, a control terminal thereof is connected to the first node N1, the first conduction terminal thereof is connected to the second node N2, and a second conduction terminal thereof is connected to the input terminal for the DC power supply voltage VSS. As for the thin film transistor T16, the control terminal thereof is connected to the second node N2, a first conduction terminal thereof is connected to the first node N1, and a second conduction terminal thereof is connected to the input terminal for the DC power supply voltage VSS. As for the thin film transistor T17, the control terminal thereof is connected to the second node N2, a first conduction terminal thereof is connected to the output terminal 419, and a second conduction terminal thereof is connected to the input terminal for the DC power supply voltage VSS. The capacitor C1 is connected to the first node N1 at one end and connected to the output terminal 419 at the other end.

2.2.4 Operation of State Storage Portion

Next, operation of the state storage portion 402 will be described with reference to FIGS. 13 to 16. First, operation performed when the vertical scan is stopped will be described, and after that, operation performed when the vertical scan is under way will be described. Note that, in the following description, of the plurality of stages (i stages) constituting the shift register 410, a stage for which it is necessary to prevent a decrease in the potential of the first node N1 caused by leakage of the charge during the pause period will be referred to as a "latch stage" for convenience. The latch stages include a stage corresponding to the stop position of the vertical scan (hereinafter referred to as a "stop stage") and stages near the stop stage. Further, a stage corresponding to the gate bus line GL that is to enter the selected state will be referred to as a "selected stage" for convenience.

Figure 13:
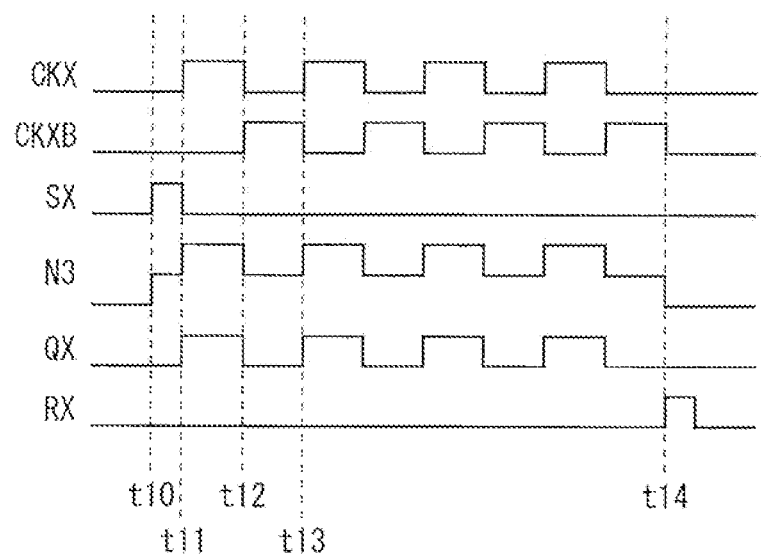
FIG. 13 is a signal waveform diagram for describing an example of operation at a latch stage of the state storage portion when a vertical scan is stopped, in the embodiment.

FIG. 13 is a signal waveform diagram for describing an example of operation at the latch stage performed when the vertical scan is stopped. When the set signal SX changes from the low level to the high level at a time t10, the thin film transistor T22 is in the diode connection state, as illustrated in FIG. 11. Thus, the pulse of this set signal SX causes the thin film transistor T22 to be turned on, and the capacitor C2 is charged. As a result, the potential of the third node N3 changes from the low level to the high level, and the thin film transistor T21 is turned on.

After that, when the control clock signal CKX changes from the low level to the high level at a time t11, the thin film transistor T21 is in the on state, and thus, the potential of the output terminal 429 increases as the potential of the input terminal 423 increases. Here, the capacitor C2 is provided between the third node N3 and the output terminal 429, as illustrated in FIG. 11, and thus, the potential of the third node N3 increases as the potential of the output terminal 429 increases (the third node N3 is bootstrapped). As a result, a high voltage is applied to the control terminal of the thin film transistor T21, and the potential of the output terminal 429 significantly increases. In other words, the output signal QX is set to the high level. As a result, the thin film transistor T30 in the connection portion 403 is turned on, and the charge is supplied to the first node N1 in the transfer portion 401.

At a time t12, the control clock signal CKX changes from the high level to the low level. As a result, the potential of the output terminal 429 (the potential of the output signal QX) decreases as the potential of the input terminal 423 decreases. Further, at the time t12, the control clock signal CKXB changes from the low level to the high level. As a result, the thin film transistor T25 is turned on, and the output signal QX is set to the low level. Then, the potential of the third node N3 decreases via the capacitor C2.

From a time t13 onward, the same and/or similar operation as the above-described operation at the time t11 and the time t12 is repeated on the basis of the clock operation of the control clock signals CKX and CKXB. In other words, with respect to the potential of the third node N3, pulling-up and pulling-down are repeated using the charging potential at the time t10 as the starting point. In this case, as can be seen from FIG. 13, when the potential of the third node N3 is pulled up, the output signal QX changes from the low level to the high level.

After that, at a time t14, when the reset signal RX changes from the low level to the high level, the thin film transistor T23 is turned on. As a result, the potential of the third node N3 decreases down to the low level. In this way, in a period from the time t14 onward, the output signal QX is maintained at the low level.

Figure 14:
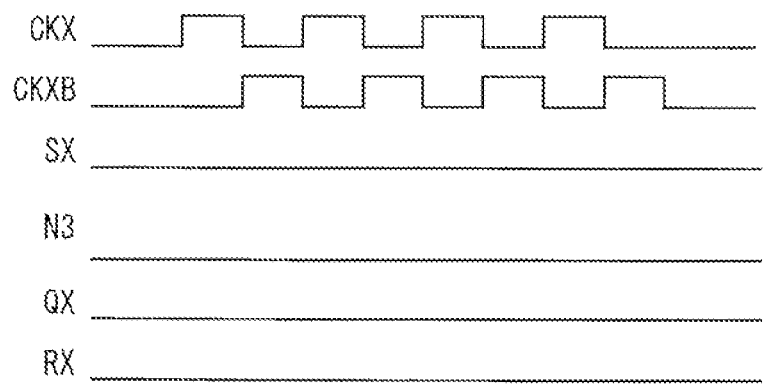
FIG. 14 is a signal waveform diagram for describing an example of operation, at a stage other than the latch stage, of the state storage portion when the vertical scan is stopped, in the embodiment.

FIG. 14 is a signal waveform diagram for describing an example of operation, at a stage other than the latch stage, performed when the vertical scan is stopped. As illustrated in FIG. 14, at the stage other than the latch stage, the set signal SX is maintained at the low level, and thus, the potential of the third node N3 is maintained at the low level. However, the potential of the third node N3 may fluctuate due to the clock operation of the control clock signal CKX and the presence of the parasitic capacitance of the thin film transistor T21. In other words, the potential of the output signal QX may increase unnecessarily. Thus, as illustrated in FIG. 11, the thin film transistor T24 is provided in the state storage portion 402. As a result of the thin film transistor T24 being provided, when the control clock signal CKX is set to the high level, the potential of the third node N3 is drawn to the same potential as the potential of the output terminal 429. Further, the thin film transistor T25 is turned on, on the basis of the control clock signal CKXB having the opposite phase to the control clock signal CKX. When the thin film transistor T25 is turned on, the potential of the output terminal 429 (the potential of the output signal QX) is set to the low level, and thus, an increase in the potential of the output signal QX caused by accumulation of the charge is prevented.

Figure 15:
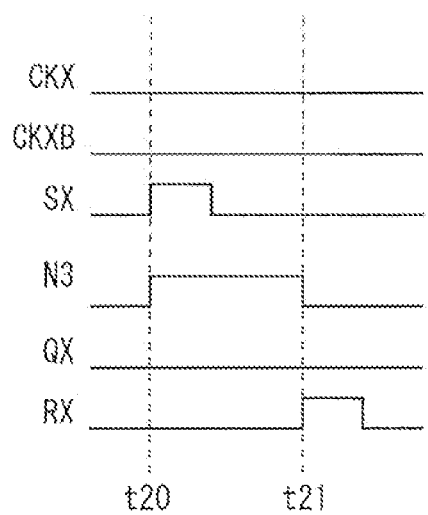
FIG. 15 is a signal waveform diagram for describing an example of operation at a selected stage of the state storage portion when the vertical scan is under way, in the embodiment.

FIG. 15 is a signal waveform diagram for describing an example of operation at the selected stage when the vertical scan is under way. At a time t20, when the set signal SX changes from the low level to the high level, the thin film transistor T22 is turned on, and the capacitor C2 is charged. As a result, the potential of the third node N3 changes from the low level to the high level. When the vertical scan is under way, the control clock signal CKX is maintained at the low level, as illustrated in FIG. 15. Thus, the potential of the input terminal 423 does not increase, and the output signal QX is maintained at the low level. At a time t21, the reset signal RX changes from the low level to the high level. As a result, the thin film transistor T23 is turned on, and the potential of the third node N3 is set to the low level.

Figure 16:
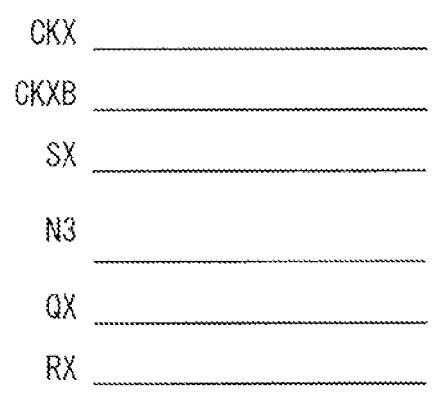

FIG. 16 is a signal waveform diagram for describing an example of operation, at a stage other than the selected stage (excluding stages near the selected stage), performed when the vertical scan is under way. As illustrated in FIG. 16, at the stage other than the selected stage, the set signal SX is maintained at the low level, and thus, the potential of the third node N3 is maintained at the low level. Further, when the vertical scan is under way, the control clock signals CKX and CKXB are also maintained at the low level. Thus, as can be seen from FIG. 16, at the stage other than the selected stage, the state storage portion 402 is maintained in a stopped state.

2.2.5 Operation of Transfer Portion

Figure 17:
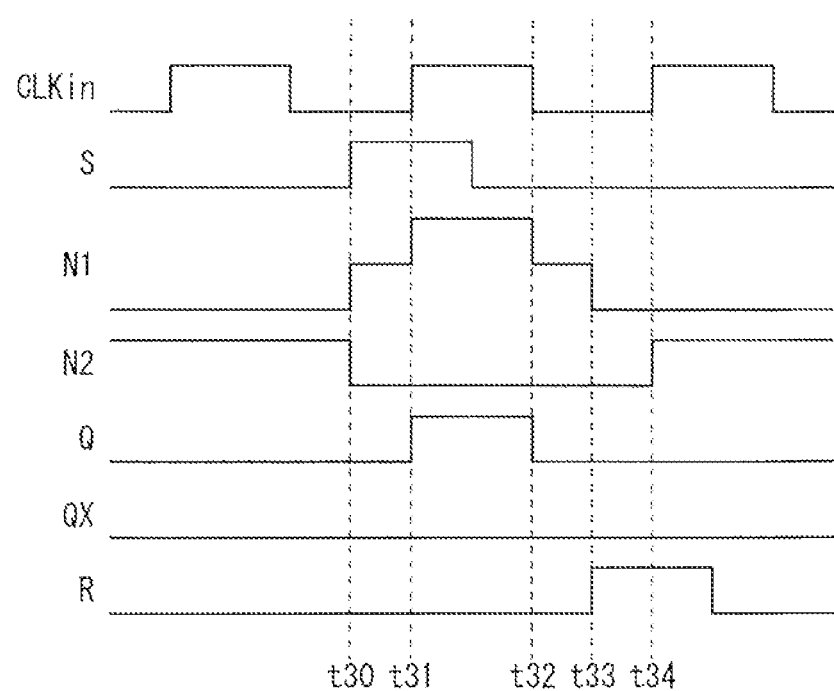
FIG. 17 is a signal waveform diagram for describing operation at the selected stage of the transfer portion when the vertical scan is under way, in the embodiment.
Figure 18:
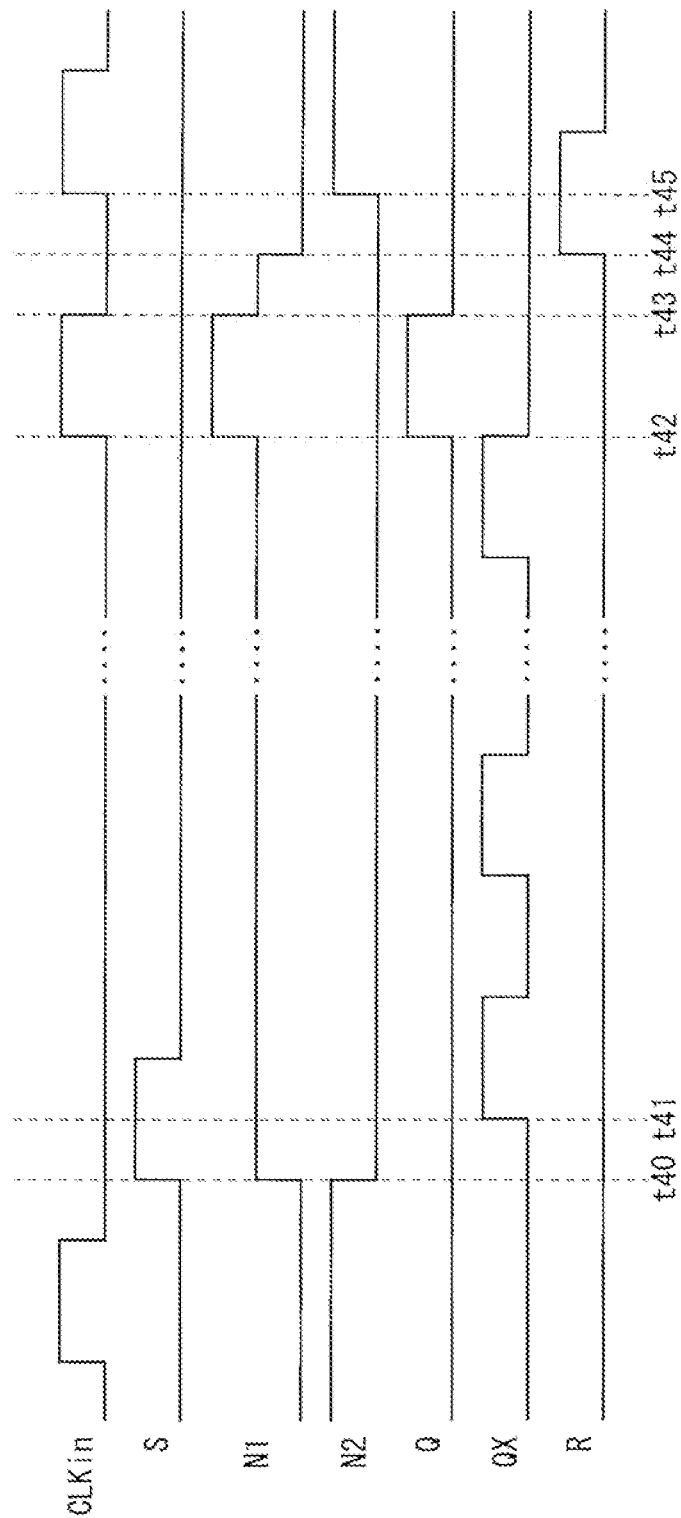
FIG. 18 is a signal waveform diagram for describing operation at the selected stage of the transfer portion when the vertical scan is stopped, in the embodiment.
Figure 19:
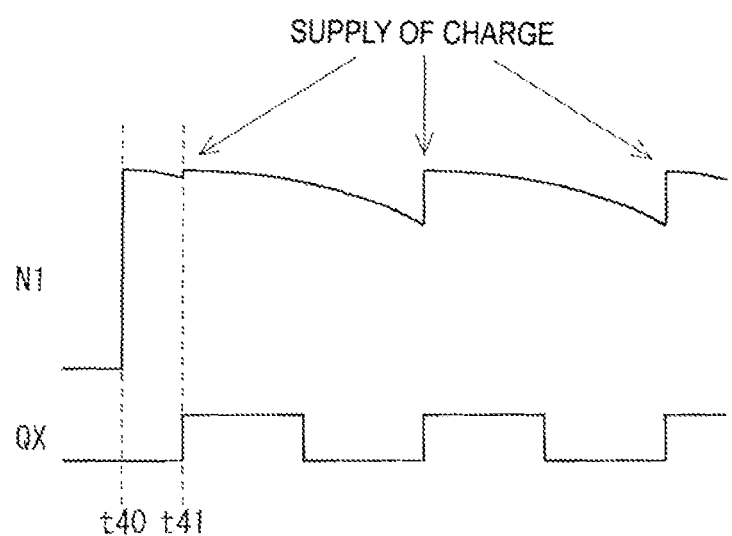
FIG. 19 is a signal waveform diagram for describing the fact that the potential of a first node is maintained at a high level in the embodiment.

Next, operation of the transfer portion 401 will be described with reference to FIGS. 17 to 19.

First, operation at the selected stage performed when the vertical scan is under way will be described (see FIG. 17). In a period before a time t30, the set signal S is at the low level, the potential of the first node N1 is at the low level, the potential of the second node N2 is at the high level, the output signal Q is at the low level, the output signal QX from the state storage portion 402 is at the low level, and the reset signal R is at the low level. The input clock signal CLKin alternates between the high level and the low level. Incidentally, a parasitic capacitance is present in the thin film transistor T11 in the transfer portion 401. Thus, in the period before the time t30, the potential of the first node N1 may fluctuate due to the clock operation of the input clock signal CLKin and the presence of the parasitic capacitance in the thin film transistor T11. Therefore, the potential of the output terminal 419 (the potential of the output signal Q), that is, the potential of the scanning signal G provided to the gate bus line GL, may increase. However, during a period in which the potential of the second node N2 is maintained at the high level, the thin film transistors T16 and T17 are maintained in the on state. Therefore, in the period before the time t30, the thin film transistors T16 and T17 are maintained in the on state, and the potential of the first node N1 and the potential of the output terminal 419 (the potential of the output signal Q) are reliably maintained at the low level. As described above, even when noise caused by the clock operation of the input clock signal CLKin is mixed into the first node N1, the potential of the corresponding scanning signal G does not increase. In this way, occurrence of abnormal operation caused by the clock operation of the input clock signal CLKin is prevented.

At the time t30, the set signal S changes from the low level to the high level. As illustrated in FIG. 12, the thin film transistor T12 is in the diode connection state, and thus, the pulse of this set signal S causes the thin film transistor T12 to be turned on, and the capacitor C1 is charged. As a result, the potential of the first node N1 changes from the low level to the high level, and the thin film transistor T11 is turned on. However, since the input clock signal CLKin is at the low level at the time t30, the output signal Q is maintained at the low level. Further, as a result of the potential of the first node N1 changing from the low level to the high level, the thin film transistor T15 is turned on. As a result, the potential of the second node N2 is set to the low level, and the thin film transistor T16 is turned off.

At a time t31, the input clock signal CLKin changes from the low level to the high level. At this time, the thin film transistor T11 is in the on state, and thus, the potential of the output terminal 419 increases as the potential of the input terminal 413 increases. Here, since the capacitor C1 is provided between the first node N1 and the output terminal 419 as illustrated in FIG. 12, the potential of the first node N1 increases as the potential of the output terminal 419 increases (the first node N1 is bootstrapped). As a result, a large voltage is applied to the control terminal of the thin film transistor T11, and the potential of the output signal Q increases up to a level sufficient to cause the gate bus line GL connected to the output terminal 419 of this transfer portion 401 to be in the selected state.

At a time t32, the input clock signal CLKin changes from the high level to the low level. As a result, the potential of the output terminal 419 (the potential of the output signal Q) decreases as the potential of the input terminal 413 decreases. When the potential of the output terminal 419 decreases, the potential of the first node N1 also decreases via the capacitor C1.

At a time t33, the reset signal R changes from the low level to the high level. With this, the thin film transistor T13 is turned on. As a result, the potential of the first node N1 decreases down to the low level.

At a time t34, the input clock signal CLKin changes from the low level to the high level. Since the thin film transistor T14 is in the diode connection state as illustrated in FIG. 12, when the input clock signal CLKin changes from the low level to the high level, the potential of the second node N2 is set to the high level. As a result, the thin film transistors T16 and T17 are turned on. Then, in a period from the time t34 onward, the same and/or similar operation as the operation in the period before the time t30 is performed.

Next, operation at the selected stage performed when the vertical scan is stopped (in other words, operation at the stop stage) will be described (see FIGS. 18 and 19). Note that it is assumed that a period from a time t41 to a time t42 is the pause period. In a period before the time t41, the same and/or similar operation as the operation in the period before the time t31 (see FIG. 17) performed at the selected stage when the vertical scan is under way is performed.

In this case, even at the time t41, the input clock signal CLKin is maintained at the low level. Instead, at the time t41, the output signal QX from the state storage portion 402 changes from the low level to the high level. As a result, a charge based on the output signal QX is supplied to the first node N1 via the input terminal 414.

During the period from the time t41 to the time t42, the output signal QX from the state storage portion 402 alternates between the high level and the low level. In this way, the charge based on the output signal QX is supplied to the first node N1 via the input terminal 414, every time the output signal QX changes from the low level to the high level. Thus, even when the potential of the first node N1 decreases due to the leakage of the charge at the thin film transistors T12, T13, and T16, the potential of the first node N1 increases every time the output signal QX changes from the low level to the high level, as illustrated in FIG. 19. Therefore, even when the leakage of the charge occurs in the thin film transistors T12, T13, and T16, the potential of the first node N1 is maintained at a high level.

At the time t42, when the input clock signal CLKin changes from the low level to the high level, the same and/or similar operation as the operation at the time t31 (see FIG. 17) performed at the selected stage when the vertical scan is under way is performed. As a result, the potential of the output signal Q increases up to a level sufficient to cause the gate bus line GL connected to the output terminal 419 of this transfer portion 401 to be in the selected state. In a period from a time t43 onward, the same and/or similar operation as the operation in a period from the time t32 onward (see FIG. 17) at the selected stage when the vertical scan is under way is performed.

As described above, at the stop stage, the potential of the first node N1 is maintained at a high level throughout the pause period. Then, after the end of the pause period, the output signal Q is set to the high level on the basis of the clock operation of the input clock signal CLKin. In this way, after the end of the pause period, the vertical scan resumes from the stop stage.

2.2.6 Effects Achieved by Adopting Unit Circuit Having Configuration Described Above According to the unit circuit 4 having the configuration described above, even when the leakage of the charge occurs at the thin film transistors T12, T13, and T16 in the transfer portion 401 during the pause period in which the vertical scan is stopped to drive the sensor electrode 50 for touch position detection, the charge is supplied to the first node N1 at each predetermined period throughout the pause period. Therefore, the potential of the first node N1 is maintained at a high level throughout the pause period. As a result, after the end of the pause period, the vertical scan can resume normally from the stop stage.

3. DRIVING METHOD FOR TOUCH DETECTION

Figure 24:
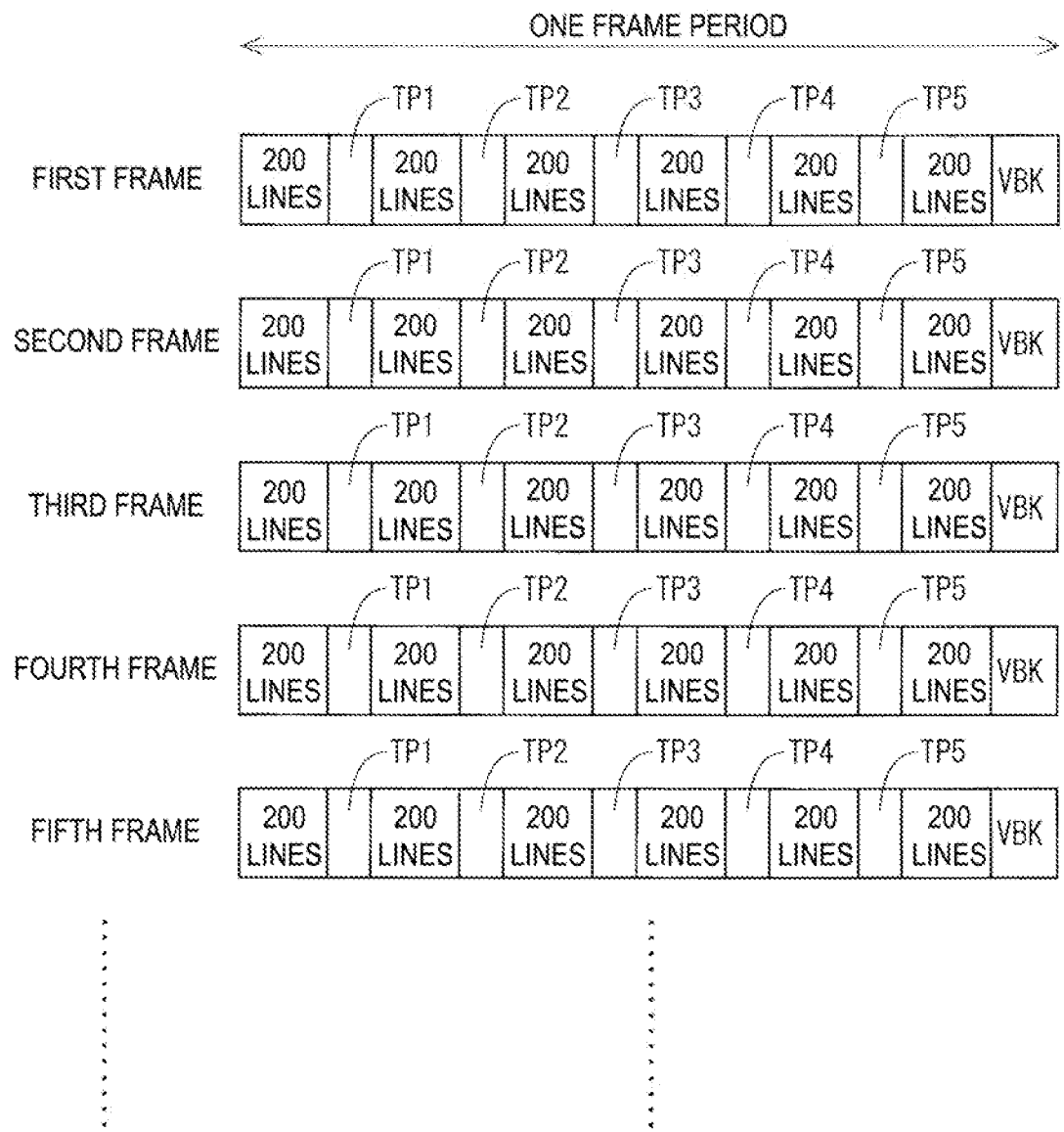
FIG. 24 is a diagram for describing an example of a known driving method.

Next, a driving method for touch detection will be described with reference to FIG. 1. As in FIG. 24, in FIG. 1, in each frame period, first touch detection timing to fifth touch detection timing (periods in which the sensor electrode 50 is driven to detect the touch position) are denoted by TP1 to TP5, respectively, and the vertical blanking period is denoted by VBK. Note that a row corresponding to the above-described stop stage is referred to as a "stop row". In this regard, for example, when focusing on the first frame in FIG. 1, the first touch detection timing TP1 appears after 50 gate bus lines GL are selected. In this case, the 51st row is the stop row.

Figure 1:
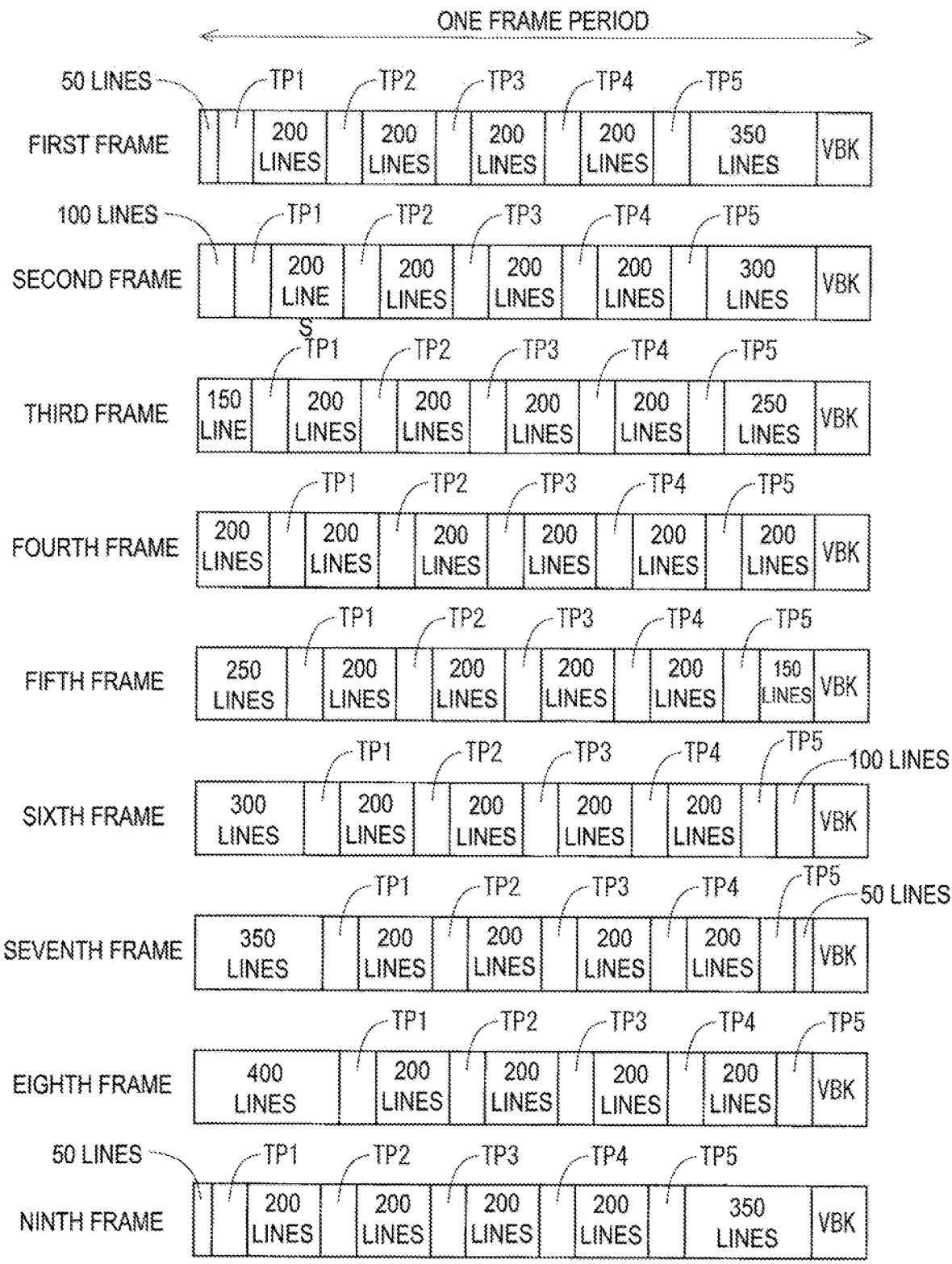
FIG. 1 is a diagram for describing a driving method according to an embodiment.

In the present embodiment, as illustrated in FIG. 1, every time the frame periods are switched, the stop row corresponding to the touch detection timing is shifted to the lower side of the display portion 200 by 50 rows each time. For example, in the first frame, the 51st row, the 251st row, the 451st row, the 651st row, and the 851st row are sequentially set to be the stop row. After that, in the second frame, the 101st row, the 301st row, the 501st row, the 701st row, and the 901st row are sequentially set to be the stop row. Further, for example, in the seventh frame, the 351st row, the 551st row, the 751st row, the 951st row, and the 1151st row are sequentially set to be the stop row. After that, in the eighth frame, the 401st row, the 601st row, the 801st row, and the 1001st row are sequentially set to be the stop row. Further, in the ninth frame, in the same manner as in the first frame, the 51st row, the 251st row, the 451st row, the 651st row, and the 851st row are sequentially set to be the stop row. In other words, throughout the operation period of the liquid crystal display device, the touch detection timing repeatedly appears in the same manner as they appear from the first frame to the eighth frame.

In order to realize such driving as described above, in the present embodiment, the control circuit 100 controls the operation of the gate driver 400 so that the scanning of the gate bus lines GL is stopped at mutually different rows in each of the eight consecutive frame periods, and controls the operation of the touch sensor drive circuit 600 so that the sensor electrode 50 is driven during a period in which the scanning of the gate bus lines GL is stopped.

Incidentally, the driving method for the liquid crystal display device according to the present embodiment includes a scanning signal line driving step of scanning the i gate bus lines GL one by one so that the video signals are written, via the corresponding source bus lines SL, to each of the pixel forming sections formed in the plurality of rows and a plurality of columns, and a sensor electrode driving step of stopping the scanning of the gate bus lines GL and driving the sensor electrode 50 to detect the touch position. Then, in the present embodiment, the stop rows are mutually different in each of the eight consecutive frame periods. Further, every time the frame periods are switched, the stop rows are shifted to the lower side of the display portion 200 at constant intervals. More specifically, assuming that N is an integer of 1 or greater and 7 or less, an interval between the stop row in the N-th frame period of the eight consecutive frame periods and the stop row in the (N+1)-th frame period of the eight consecutive frame periods is the same for all of N. Further, in each frame period, the touch detection timing appears at constant intervals. In this regard, in the present embodiment, assuming that Q is an integer of 1 or greater and 4 or less, in each frame period, an interval between the stop row corresponding to Q-th touch detection timing and the stop row corresponding to (Q+1)-th touch detection timing is the same for all of Q.

Note that, in the present embodiment, the driving is performed so that the stop rows are mutually different in each of the eight consecutive frame periods, but the number of frame periods (number of consecutive periods) in which the stop rows are mutually different is not limited to eight. Further, in the present embodiment, processing for driving the sensor electrode 50 to detect the touch position (sensor electrode driving processing) is performed five times in each frame period, but the number of times the sensor electrode driving processing is performed in each frame period is not limited to five.

4. EFFECTS

Figure 20:
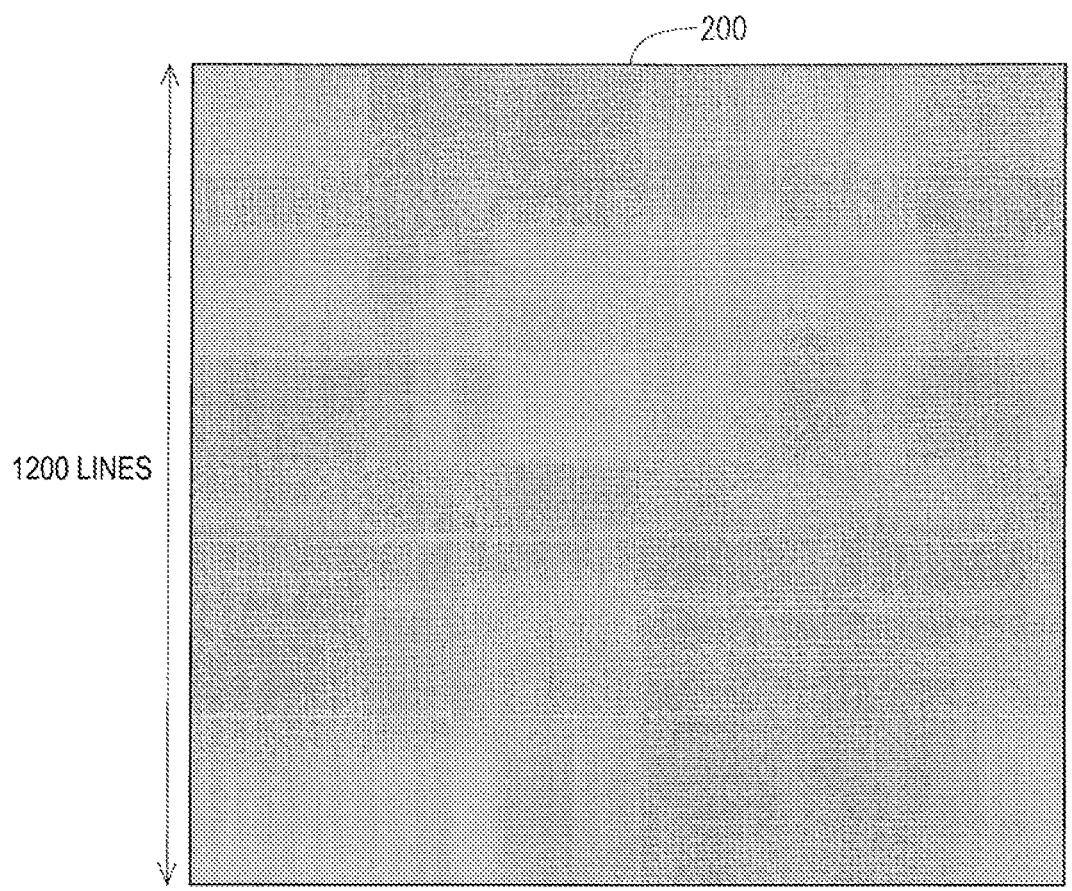
FIG. 20 is a diagram for describing an effect of the embodiment.
Figure 25:
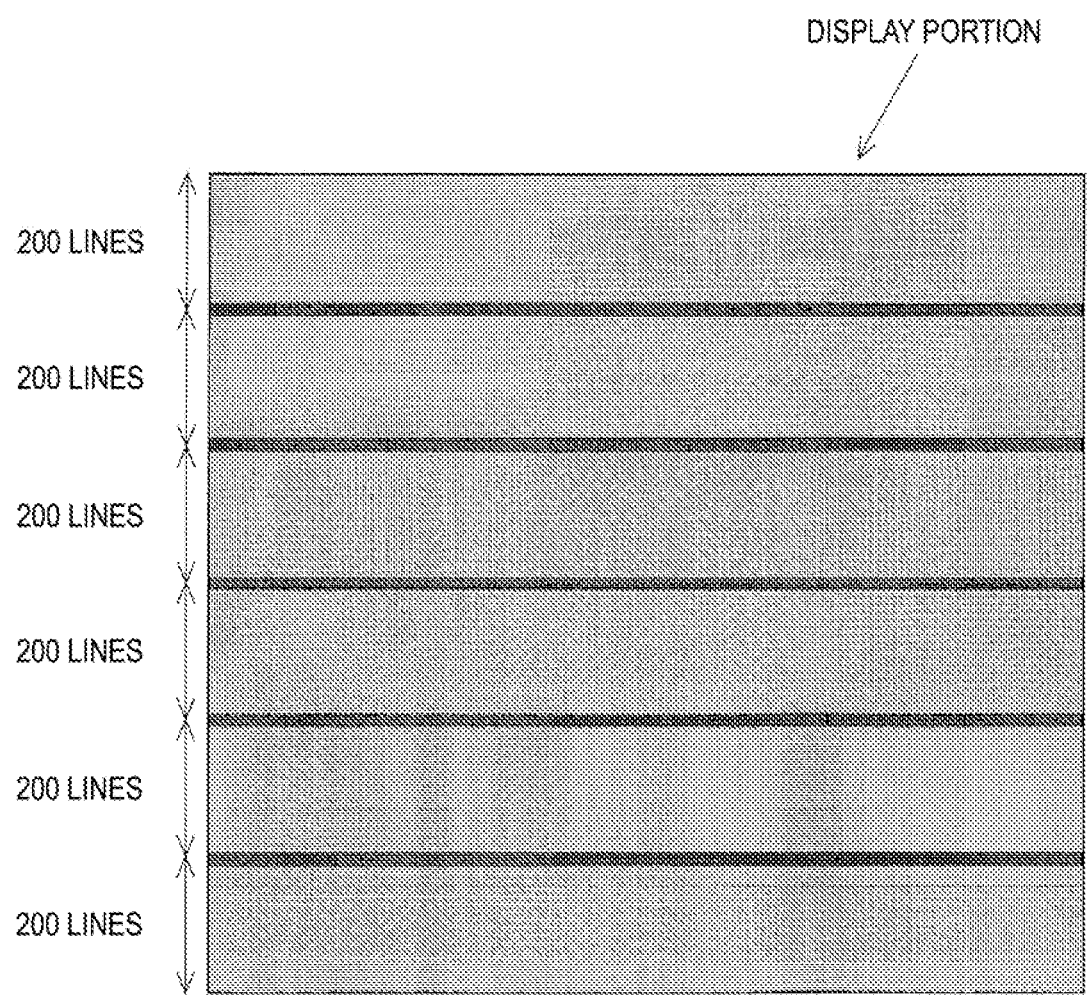
FIG. 25 is a diagram for describing stripe-shaped unevenness that becomes visible in a known configuration.

According to the present embodiment, the sensor electrode 50 for touch position detection is provided in the liquid crystal panel. Although the plurality of gate bus lines GL are scanned one by one in order to write the video signals into each of the plurality of pixel forming sections constituting the pixel matrix, the driving of the sensor electrode 50 is performed in a state in which the scanning of the gate bus lines GL is stopped. In this regard, the stop rows at which the scanning of the gate bus lines GL is stopped in order to drive the sensor electrode 50 (in other words, to detect the touch position) are different for each frame period. More specifically, the stop rows are mutually different in each of the eight consecutive frame periods. As a result, when focusing on each frame period, when the solid screen having the intermediate gray-scale is displayed on the display portion 200, the transmittance is different between the pixel forming sections corresponding to the stop rows and the pixel forming sections corresponding to the rows other than the stop rows. However, since the stop rows are shifted when the frame periods are switched, unlike the related art (see FIG. 25), an image having uniform brightness over the entire area and having no stripe-shaped unevenness is visually perceived by the human eye, as schematically illustrated in FIG. 20. As described above, according to the present embodiment, the occurrence of the stripe-shaped unevenness is suppressed in the active matrix liquid crystal display device with the built-in touch sensor.

5. MODIFIED EXAMPLES

Modified examples of the above-described embodiment will be described below.

5.1 First Modified Example

In the above-described embodiment, the control circuit 100 controls the operation of the gate driver 400 so that the scanning of the gate bus lines GL is stopped at mutually different rows in each of the eight consecutive frame periods, and controls the operation of the touch sensor drive circuit 600 so that the sensor electrode 50 is driven during the period in which the scanning of the gate bus lines GL is stopped. In this way, the stop rows are mutually different in each of the eight consecutive frame periods. However, the configuration is not limited to this example, and it is sufficient that the stop rows are mutually different in each of at least two consecutive frame periods. In other words, it is sufficient that the control circuit 100 controls the operation of the gate driver 400 so that the scanning of the gate bus lines GL is stopped at mutually different rows in the first frame period and the second frame period, which are two consecutive frame periods, and controls the operation of the touch sensor drive circuit 600 so that the sensor electrode 50 is driven during the period in which the scanning of the gate bus lines GL is stopped.

5.2 Second Modified Example

Further, in the above-described embodiment, every time the frame periods are switched, the stop rows are shifted to the lower side of the display portion 200 at the constant intervals. However, the configuration is not limited to this example, and for example, the stop rows in each frame period may be randomly determined.

5.3 Third Modified Example

Further, in the above-described embodiment, the touch detection timing appears in each frame period at the constant intervals, but the configuration is not limited to this example. For example, in each frame period, an interval from the first touch detection timing to the second touch detection timing, and an interval from the second touch detection timing to the third touch detection timing may be different from each other.

5.4 Fourth Modified Example

Figure 21:
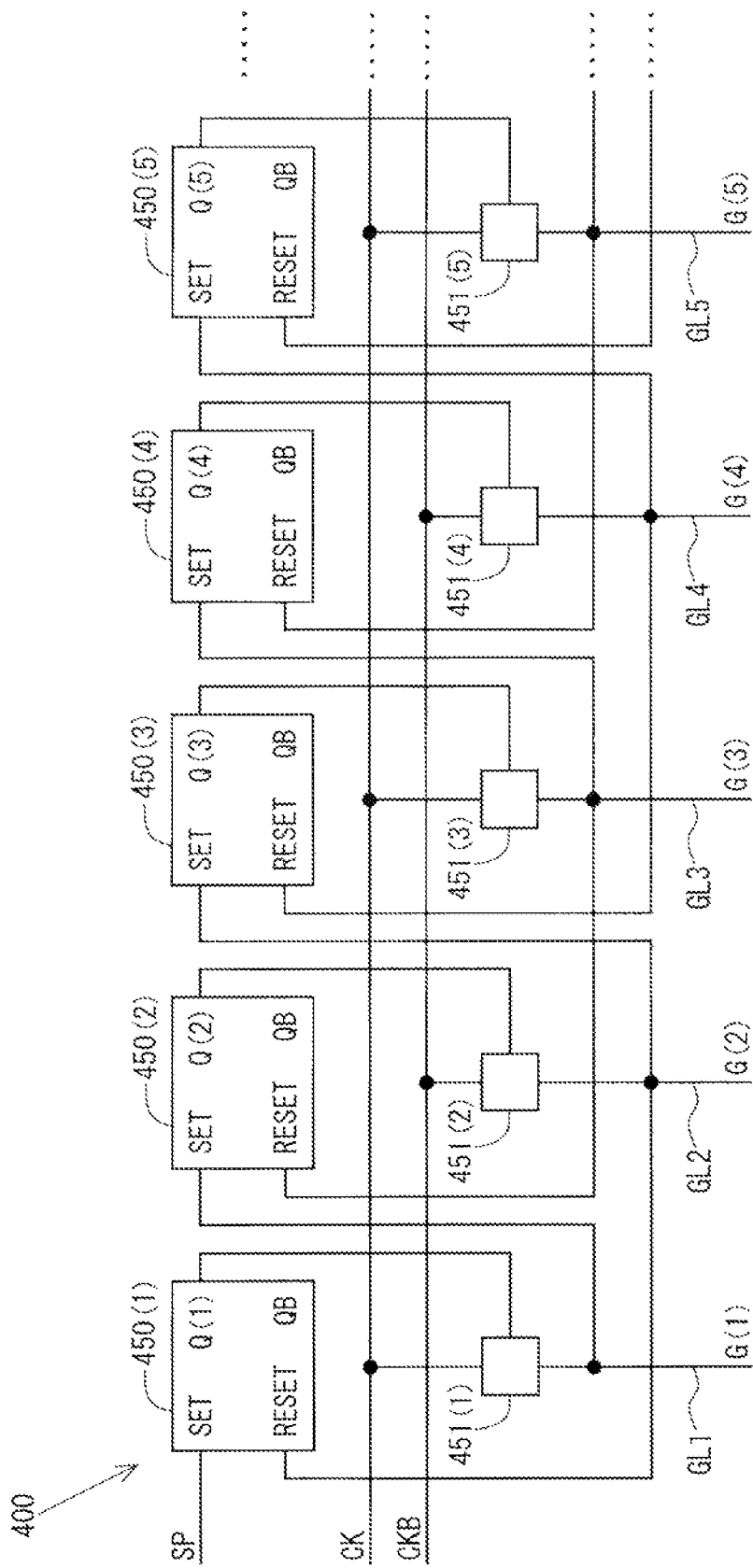
FIG. 21 is a block diagram illustrating a configuration of a gate driver according to a fourth modified example of the embodiment.

A modified example of the configuration of the gate driver 400 will be described below as a fourth modified example. FIG. 21 is a block diagram illustrating a configuration of the gate driver 400 according to the fourth modified example. Note that, in FIG. 21, only a portion corresponding to the first to fifth rows is illustrated. The gate driver 400 is constituted by a shift register constituted by i flip-flop circuits 450(1) to 450(i) corresponding to the i gate bus lines GL1 to GLi in a one-to-one manner, and by i analog switches 451(1) to 451(i) corresponding to the i flip-flop circuits 450(1) to 450(i) in a one-to-one manner. Each of the flip-flop circuits 450 is a set/reset-type flip-flop circuit. A start pulse signal SP, a clock signal CK, and the clock signal CKB are provided to this gate driver 400 as the gate control signals GCTL. The clock signals CK and CKB are both two-phase clock signals.

With respect to each of the analog switches 451 corresponding to the flip-flop circuits 450 at odd-numbered stages, the output signal Q output from the flip-flop circuit 450 is provided as a control signal, and the clock signal CK is provided as an input signal. With respect to each of the analog switches 451 corresponding to the flip-flop circuits 450 at even-numbered stages, the output signal Q output from the flip-flop circuit 450 is provided as a control signal, and the clock signal CKB is provided as an input signal. An output signal from the analog switch 451 corresponding to the flip-flop circuit 450 at a chosen stage is provided to the corresponding gate bus line GL as the scanning signal G.

With respect to a flip-flop circuit 450(k) at the chosen stage (k-th stage in this case), a scanning signal G(k−1) output via an analog switch 451(k−1) corresponding to a flip-flop circuit 450(k−1), which is at a stage immediately prior to the chosen stage, is provided as a set signal SET, and a scanning signal G(k+1) output via an analog switch 451(k+1) corresponding to a flip-flop circuit 450(k+1), which is at a stage immediately after the chosen stage, is provided as a reset signal RESET. However, the start pulse signal SP is provided to the flip-flop circuit 450(1) at the first stage, as the set signal SET.

Figure 22:
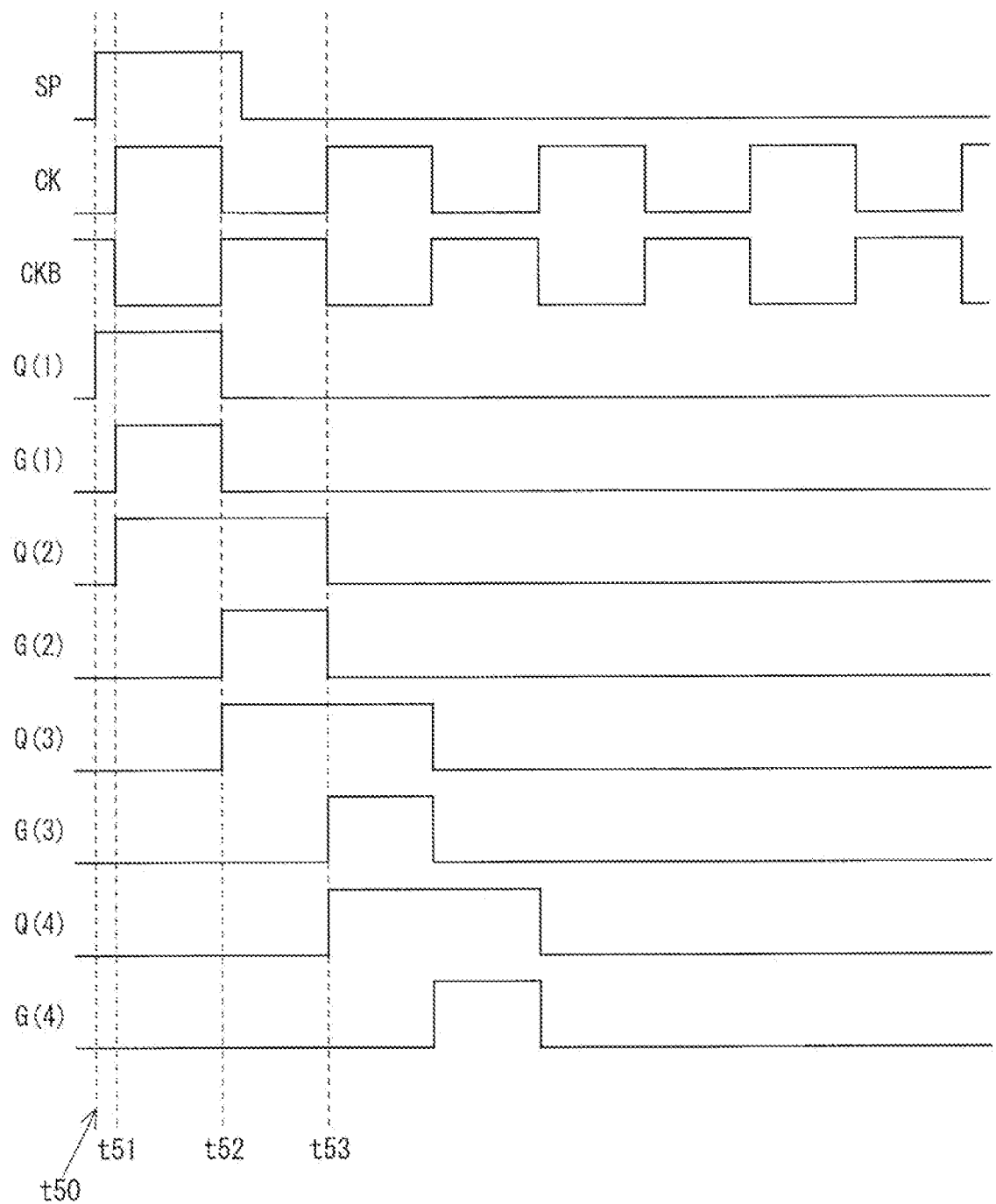
FIG. 22 is a signal waveform diagram for describing operation of the gate driver according to the fourth modified example of the embodiment.

FIG. 22 is a signal waveform diagram for describing operation of the gate driver 400 in the fourth modified example. When the start pulse signal SP changes from the low level to the high level at a time t50, an output signal Q(1) from the flip-flop circuit 450(1) changes from the low level to the high level. As a result, the analog switch 451(1) is turned on. At this time, since the clock signal CK is at the low level, the scanning signal G(1) is maintained at the low level.

At a time t51, the clock signal CK changes from the low level to the high level. At this time, since the analog switch 451(1) is in the on state, the scanning signal G(1) changes from the low level to the high level. As a result, an output signal Q(2) from the flip-flop circuit 450(2) changes from the low level to the high level, and the analog switch 451(2) is turned on. At this time, since the clock signal CKB is at the low level, the scanning signal G(2) is maintained at the low level.

At a time t52, the clock signal CK changes from the high level to the low level. As a result, the scanning signal G(1) changes from the high level to the low level. Further, at the time t52, the clock signal CKB changes from the low level to the high level. At this time, since the analog switch 451(2) is in the on state, the scanning signal G(2) changes from the low level to the high level. As a result, an output signal Q(3) from the flip-flop circuit 450(3) changes from the low level to the high level, and the analog switch 451(3) is turned on. At this time, since the clock signal CK is at the low level, the scanning signal G(3) is maintained at the low level. Further, as a result of the scanning signal G(2) changing from the low level to the high level, the output signal Q(1) from the flip-flop circuit 450(1) changes from the high level to the low level.

At a time t53, the clock signal CKB changes from the high level to the low level. As a result, the scanning signal G(2) changes from the high level to the low level. Further, at the time t53, the clock signal CK changes from the low level to the high level. At this time, since the analog switch 451(3) is in the on state, the scanning signal G(3) changes from the low level to the high level. As a result, an output signal Q(4) from the flip-flop circuit 450(4) changes from the low level to the high level, and the analog switch 451(4) is turned on. At this time, since the clock signal CKB is at the low level, the scanning signal G(4) is maintained at the low level. Further, as a result of the scanning signal G(3) changing from the low level to the high level, the output signal Q(2) from the flip-flop circuit 450(2) changes from the high level to the low level.

As described above, in a similar manner to the above-described embodiment, the scanning signals G(1) to G(i), which are sequentially set to the high level (active) for the predetermined period each time, are provided to the gate bus lines GL1 to GLi in the display portion 200, respectively. In other words, the i gate bus lines GL1 to GLi sequentially enter a selected state.

Figure 23:
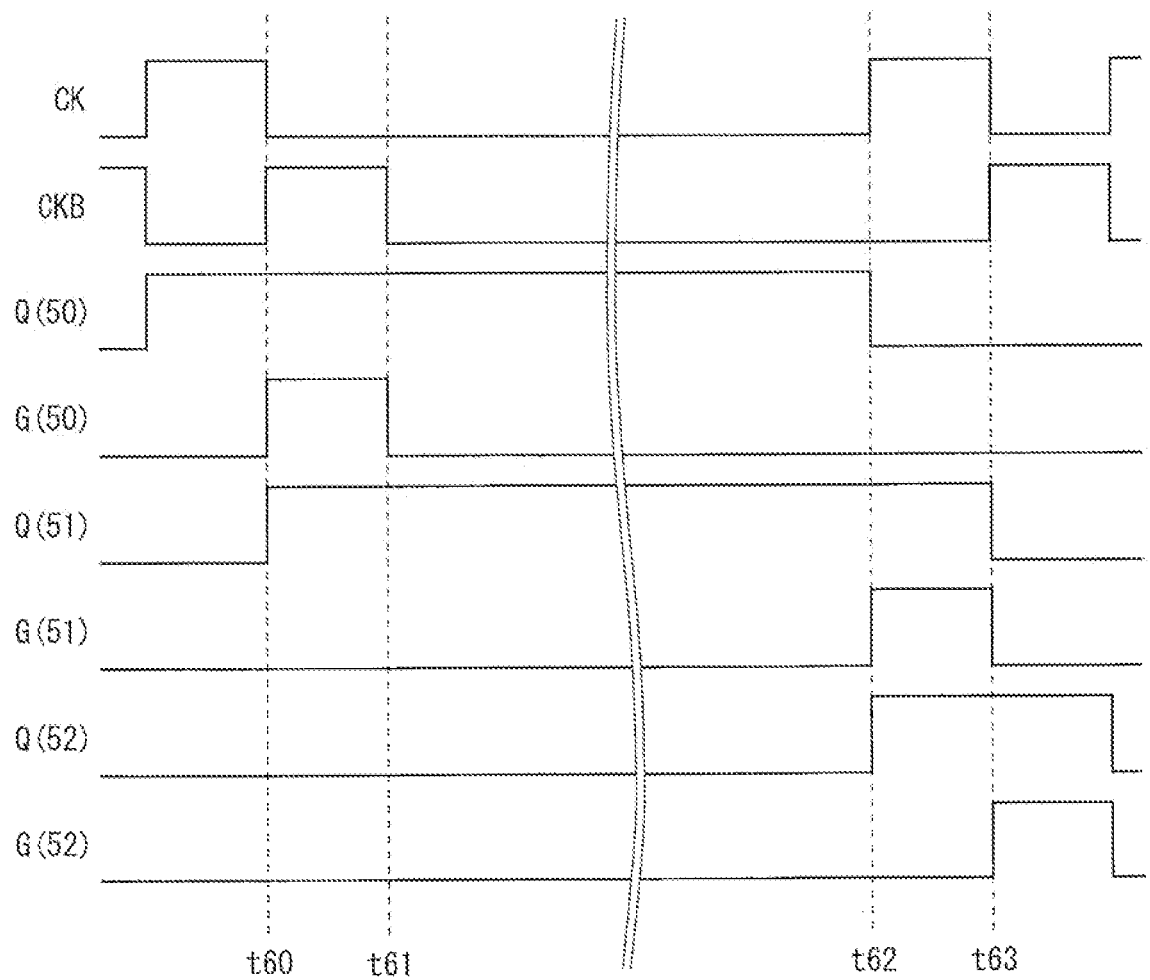
FIG. 23 is a signal waveform diagram for describing operation of the gate driver when the vertical scan is stopped, in the fourth modified example of the embodiment.

Next, with reference to FIG. 23, operation of the gate driver 400 performed when the vertical scan is stopped in the fourth modified example will be described. Note that, here, a case will be described, as an example, in which the vertical scan is stopped after the gate bus line GL50 corresponding to the 50th row has entered the selected state.

When the scanning signal G(50) changes from the low level to the high level at a time t60, an output signal Q(51) from the flip-flop circuit 450(51) changes from the low level to the high level, and the analog switch 451(51) is turned on.

At a time t61, the clock signal CKB changes from the high level to the low level. As a result, the scanning signal G(50) changes from the high level to the low level. Then, from the time t61 onward, the clock operation of the clock signals CK and CKB is stopped. At this time, an output signal Q(50) from the flip-flop circuit 450(50) and the output signal Q(51) from the flip-flop circuit 450(51) are maintained at the high level. Note that the sensor electrode 50 is driven to detect the touch position during a period from the time t61 to a time t62.

At the time t62, the clock operation of the clock signals CK and CKB resumes. At the time t62, the clock signal CK changes from the low level to the high level. At this time, since the analog switch 451(51) is in the on state, the scanning signal G(51) changes from the low level to the high level. As a result, an output signal Q(52) from the flip-flop circuit 450(52) changes from the low level to the high level, and the analog switch 451(52) is turned on. At this time, since the clock signal CKB is at the low level, the scanning signal G(52) is maintained at the low level. Further, as a result of the scanning signal G(51) changing from the low level to the high level, the output signal Q(50) from the flip-flop circuit 450(50) changes from the high level to the low level.

At a time t63, the clock signal CK changes from the high level to the low level. As a result, the scanning signal G(51) changes from the high level to the low level. Further, at the time t63, the clock signal CKB changes from the low level to the high level. At this time, since the analog switch 451(52) is in the on state, the scanning signal G(52) changes from the low level to the high level. As a result, the output signal Q(51) from the flip-flop circuit 450(51) changes from the high level to the low level.

As described above, the vertical scan can be stopped by stopping the clock operation of the clock signals CK and the CKB.

6. OTHER

Although the disclosure has been described in detail above, the above description is exemplary in all respects and is not limited thereto. It is understood that numerous other modifications or variations can be made without departing from the scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A driving method for a liquid crystal display device including a plurality of video signal lines configured to transmit a video signal, a plurality of scanning signal lines intersecting the plurality of video signal lines, a liquid crystal panel including a display portion including pixel forming sections provided in a matrix shape in a plurality of rows and a plurality of columns in correspondence to the plurality of video signal lines and the plurality of scanning signal lines, and a sensor electrode for touch position detection built into the liquid crystal panel, the driving method comprising:
    scanning the plurality of scanning signal lines, one by one, to write the video signal, via a corresponding video signal line of the plurality of video signal lines, into each of the pixel forming sections provided in the plurality of rows and the plurality of columns; and
    driving the sensor electrode for the touch position detection after the scanning of a scanning signal line of the plurality of scanning signal lines is stopped,
    wherein a stop row, being a row where the scanning of the scanning signal line is stopped in the driving of the sensor electrode, is different in a first frame period and a second frame period, the first and second frame periods being two consecutive frame periods,
    in the first frame period, all of the plurality of scanning signal lines are scanned one by one, and
    in the second frame period, all of the plurality of scanning signal lines are scanned one by one.

2. The driving method according to claim 1,
    wherein, when K is an integer of 3 or greater, the stop row is mutually different in each of K consecutive frame periods.

3. The driving method according to claim 2,
    wherein, when N is an integer of 1 or greater and (K−1) or less, an interval between the stop row in an N-th frame period of the K consecutive frame periods and the stop row in an (N+1)-th frame period of the K consecutive frame periods is identical regardless of a value of the N.

4. The driving method according to claim 1,
    wherein sensor driving processing, which is the driving of the sensor electrode, is performed three or more times in each frame period.

5. The driving method according to claim 4,
    wherein, when P is an integer of 3 or greater, the sensor driving processing is performed P times in each of the frame periods, and when Q is an integer of 1 or greater and (P−1) or less, in each of the frame periods, an interval between the stop row in a Q-th sensor driving processing and the stop row in a (Q+1)-th sensor driving processing is identical regardless of a value of the Q.

6. A liquid crystal display device including a plurality of video signal lines configured to transmit a video signal, a plurality of scanning signal lines intersecting the plurality of video signal lines, a liquid crystal panel including a display portion including pixel forming sections provided in a matrix shape in a plurality of rows and a plurality of columns in correspondence to the plurality of video signal lines and the plurality of scanning signal lines, and a sensor electrode for touch position detection built into the liquid crystal panel, the liquid crystal display device comprising:
    a scanning signal line drive circuit configured to scan the plurality of scanning signal lines one by one, to write, via a corresponding video signal line of the plurality of video signal lines, the video signal into each of the pixel forming sections provided in the plurality of rows and the plurality of columns;
    a sensor electrode drive circuit configured to drive the sensor electrode; and
    a control circuit configured to control operation of the scanning signal line drive circuit and operation of the sensor electrode drive circuit,
    wherein the control circuit controls the operation of the scanning signal line drive circuit to cause the scanning of a scanning signal line of the plurality of scanning signal lines to be stopped at mutually different rows in each of a first frame period and a second frame period, the first and second frame periods being two consecutive frame periods, and controls the operation of the sensor electrode drive circuit to cause the sensor electrode to be driven during a period in which the scanning of the scanning signal lines is stopped,
    the control circuit further controls the operation of the scanning signal line drive circuit to cause all of the plurality of scanning signal lines to be scanned one by one in the first frame period, and
    the control circuit further controls the operation of the scanning signal line drive circuit to cause all of the plurality of scanning signal lines to be scanned one by one in the second frame period.

* * * * *